(12) United States Patent
Jhang et al.

(10) Patent No.: US 11,598,937 B2
(45) Date of Patent: Mar. 7, 2023

(54) OPTICAL IMAGING LENS

(71) Applicant: GENIUS ELECTRONIC OPTICAL (XIAMEN) CO., LTD., Fujian (CN)

(72) Inventors: Jia-Sin Jhang, Taichung (TW); Maozong Lin, Fujian (CN); Feng Li, Fujian (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 261 days.

(21) Appl. No.: 17/123,135

(22) Filed: Dec. 16, 2020

(65) Prior Publication Data

US 2021/0165190 A1 Jun. 3, 2021

Related U.S. Application Data

(63) Continuation of application No. 16/532,502, filed on Aug. 6, 2019, now Pat. No. 10,901,187, which is a continuation of application No. 15/917,840, filed on Mar. 12, 2018, now Pat. No. 10,429,621.

(30) Foreign Application Priority Data

Dec. 29, 2017 (CN) .......................... 201711477961.1

(51) Int. Cl.
 *G02B 13/00* (2006.01)
 *G02B 9/64* (2006.01)
 *G02B 3/04* (2006.01)

(52) U.S. Cl.
 CPC ........... *G02B 13/0045* (2013.01); *G02B 3/04* (2013.01); *G02B 9/64* (2013.01)

(58) Field of Classification Search
 CPC ........ G02B 13/0045; G02B 3/04; G02B 9/64; G02B 13/18
 USPC .......................................................... 359/708
 See application file for complete search history.

(56) References Cited

U.S. PATENT DOCUMENTS

| 2019/0204558 A1* | 7/2019 | Jhang | G02B 13/0045 |
| 2019/0204559 A1* | 7/2019 | Jhang | G02B 13/06 |
| 2019/0204560 A1* | 7/2019 | Jhang | G02B 9/64 |

* cited by examiner

*Primary Examiner* — Mohammed A Hasan
(74) *Attorney, Agent, or Firm* — JCIPRNET

(57) ABSTRACT

An optical imaging lens including a first lens element to an eighth lens element arranged in sequence from an object side to an image side along an optical axis is provided. A periphery region of the image-side surface of the first lens element is concave. An optical axis region of the object-side surface of the fourth lens element is convex. The sixth lens element has positive refracting power. An optical axis region of the object-side surface of the seventh lens element is convex, and an optical axis region of the image-side surface of the seventh lens element is concave.

20 Claims, 34 Drawing Sheets

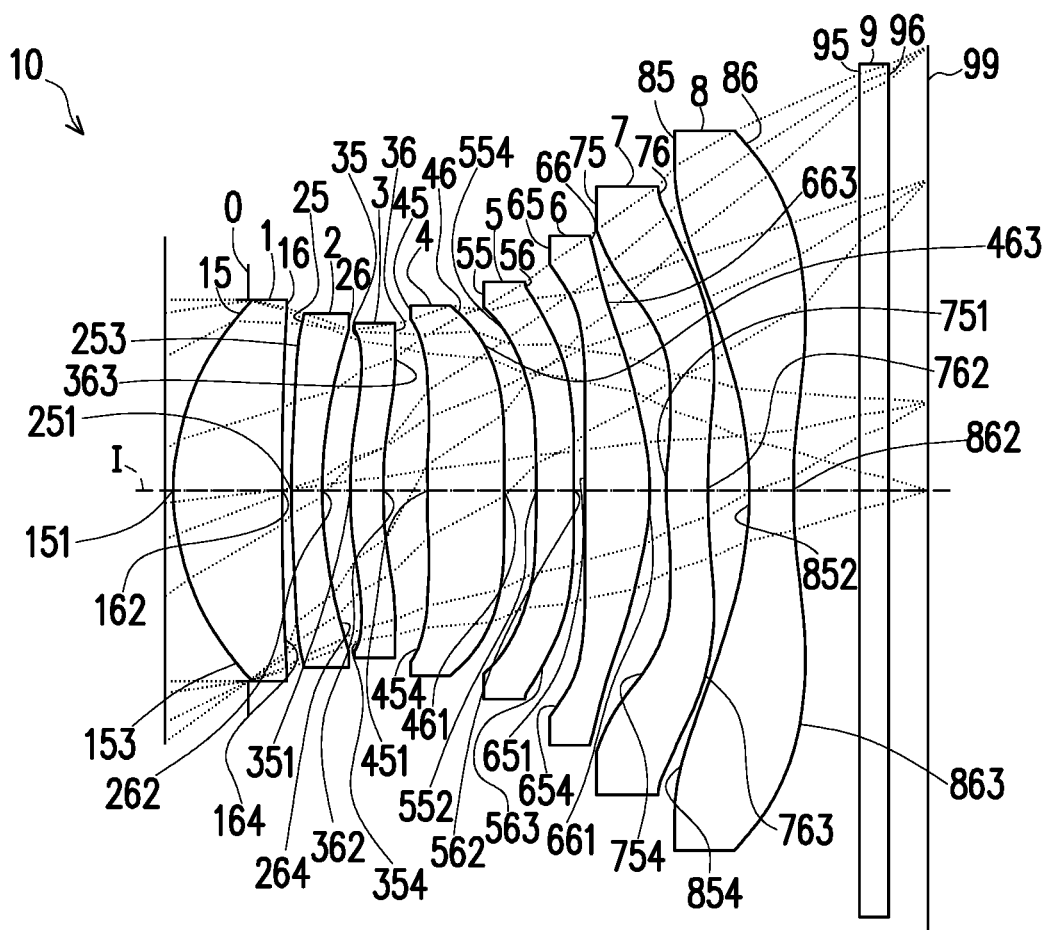
FIG. 6
— 470nm
- - - 555nm
- · - 650nm
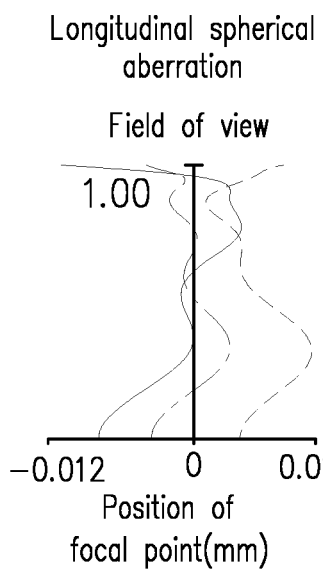
Longitudinal spherical aberration
Field of view
1.00
−0.012   0   0.01
Position of focal point(mm)
FIG. 7A
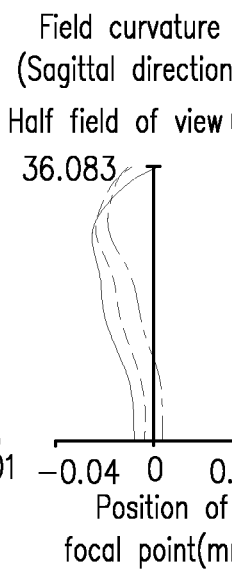
Field curvature (Sagittal direction)
Half field of view (°)
36.083
−0.04   0   0.045
Position of focal point(mm)
FIG. 7B
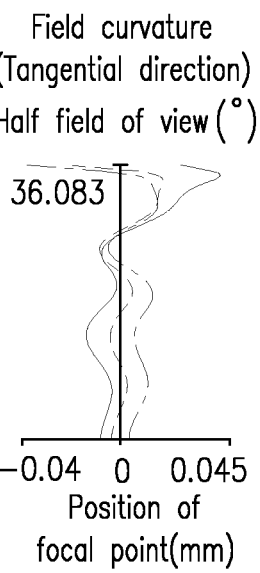
Field curvature (Tangential direction)
Half field of view (°)
36.083
−0.04   0   0.045
Position of focal point(mm)
FIG. 7C
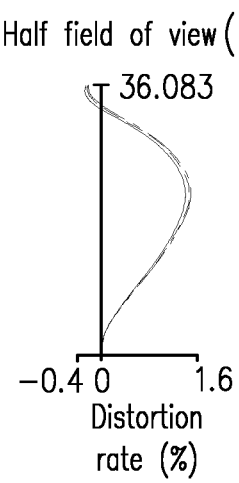
Distortion
Half field of view (°)
36.083
−0.4   0   1.6
Distortion rate (%)
FIG. 7D

| First embodiment |||||||
|---|---|---|---|---|---|---|
| Effective focal length=4.446 mm, Half field of view=36.083°, System length= 5.494 mm, F-number=1.600, Image height= 3.238 mm |||||||
| Element | Surface | Radius (mm) | Thickness (mm) | Refractive index | Abbe number | Focal Length (mm) |
| Object | | Infinity | Infinity | | | |
| Aperture 0 | | Infinity | -0.549 | | | |
| First lens element 1 | Object-side surface 15 | 1.950 | 0.791 | 1.545 | 55.987 | 3.870 |
| | Image-side surface 16 | 21.550 | 0.069 | | | |
| Second lens element 2 | Object-side surface 25 | 8.718 | 0.220 | 1.661 | 20.373 | -7.187 |
| | Image-side surface 26 | 3.062 | 0.208 | | | |
| Third lens element 3 | Object-side surface 35 | 2.968 | 0.240 | 1.661 | 20.373 | 53.802 |
| | Image-side surface 36 | 3.130 | 0.325 | | | |
| Fourth lens element 4 | Object-side surface 45 | 15.459 | 0.557 | 1.545 | 55.987 | 18.568 |
| | Image-side surface 46 | -29.126 | 0.231 | | | |
| Fifth lens element 5 | Object-side surface 55 | -20.007 | 0.270 | 1.661 | 20.373 | -15.954 |
| | Image-side surface 56 | 22.864 | 0.088 | | | |
| Sixth lens element 6 | Object-side surface 65 | 73.429 | 0.468 | 1.545 | 55.987 | 3.778 |
| | Image-side surface 66 | -2.119 | 0.126 | | | |
| Seventh lens element 7 | Object-side surface 75 | 3.813 | 0.300 | 1.545 | 55.987 | 62.882 |
| | Image-side surface 76 | 4.170 | 0.303 | | | |
| Eighth lens element 8 | Object-side surface 85 | -2.820 | 0.320 | 1.545 | 55.987 | -2.929 |
| | Image-side surface 86 | 3.847 | 0.488 | | | |
| Filter 9 | Object-side surface 95 | Infinity | 0.210 | 1.517 | 64.167 | |
| | Image-side surface 96 | Infinity | 0.280 | | | |
| | Image plane 99 | Infinity | | | | |

FIG. 8

| Surface | K | $a_2$ | $a_4$ | $a_6$ | $a_8$ |
|---|---|---|---|---|---|
| 15 | 0.000000E+00 | 0.000000E+00 | -4.631971E-03 | 9.239591E-03 | -8.335893E-03 |
| 16 | 0.000000E+00 | 0.000000E+00 | -3.471929E-03 | -7.396096E-03 | 9.621139E-03 |
| 25 | 0.000000E+00 | 0.000000E+00 | -1.635388E-02 | -4.301654E-03 | 8.125355E-03 |
| 26 | 0.000000E+00 | 0.000000E+00 | -2.628258E-02 | 3.750963E-03 | -1.492690E-02 |
| 35 | 0.000000E+00 | 0.000000E+00 | -6.561430E-02 | -3.084951E-02 | 8.333136E-03 |
| 36 | 0.000000E+00 | 0.000000E+00 | -6.035476E-02 | -1.085693E-02 | -8.434549E-03 |
| 45 | 0.000000E+00 | 0.000000E+00 | -4.435343E-02 | -2.278524E-02 | 1.119464E-02 |
| 46 | 0.000000E+00 | 0.000000E+00 | -6.528369E-02 | -5.011874E-02 | 1.126826E-02 |
| 55 | 0.000000E+00 | 0.000000E+00 | -1.116329E-01 | -1.530891E-02 | 1.584510E-02 |
| 56 | 0.000000E+00 | 0.000000E+00 | -1.627543E-01 | 6.210259E-02 | -1.132707E-02 |
| 65 | 0.000000E+00 | 0.000000E+00 | -2.454535E-02 | 1.974909E-02 | -1.353142E-02 |
| 66 | 0.000000E+00 | 0.000000E+00 | 6.961634E-02 | -5.208891E-03 | -3.410785E-03 |
| 75 | 0.000000E+00 | 0.000000E+00 | -1.471942E-01 | -5.924438E-03 | 7.696576E-03 |
| 76 | 0.000000E+00 | 0.000000E+00 | -9.352557E-02 | 1.052332E-02 | 1.936769E-04 |
| 85 | 0.000000E+00 | 0.000000E+00 | 2.091278E-02 | -1.209988E-03 | 3.734736E-04 |
| 86 | 0.000000E+00 | 0.000000E+00 | -6.727471E-02 | 1.230280E-02 | -1.306048E-03 |
| Surface | $a_{10}$ | $a_{12}$ | $a_{14}$ | $a_{16}$ | |
| 15 | 2.355577E-03 | 1.276939E-03 | -9.433212E-04 | 1.118586E-04 | |
| 16 | -2.790311E-03 | -1.556492E-03 | 9.899357E-04 | -1.326403E-03 | |
| 25 | 3.078399E-03 | -2.512262E-03 | -7.677384E-04 | 7.170525E-04 | |
| 26 | 1.706766E-02 | 3.079830E-03 | -1.176994E-02 | 4.378755E-03 | |
| 35 | -1.254861E-02 | -9.339617E-04 | 9.309238E-03 | -3.589356E-03 | |
| 36 | 1.156226E-03 | 2.972580E-03 | 1.587775E-03 | -8.209729E-04 | |
| 45 | -4.190943E-03 | -1.360257E-03 | 4.260290E-05 | 4.893148E-04 | |
| 46 | 8.161547E-03 | -2.251786E-03 | -1.695103E-03 | 4.656550E-04 | |
| 55 | 2.526058E-04 | -1.646456E-03 | 3.789883E-04 | -1.806245E-04 | |
| 56 | -3.207287E-03 | 5.727144E-04 | 6.865796E-04 | -1.200260E-04 | |
| 65 | 3.909592E-04 | -2.759268E-04 | 4.324791E-04 | -5.640346E-05 | |
| 66 | 1.331735E-03 | -2.548667E-05 | 3.387526E-05 | -1.350794E-05 | |
| 75 | 7.618131E-04 | -1.699526E-04 | -1.282477E-05 | -3.878088E-06 | |
| 76 | 4.680796E-05 | -1.976186E-05 | -1.366721E-06 | 3.846320E-07 | |
| 85 | 4.688870E-06 | -2.463891E-06 | -6.360845E-07 | 9.672307E-08 | |
| 86 | 1.950038E-05 | 1.348275E-06 | 3.738199E-07 | -1.380204E-08 | |

FIG. 9

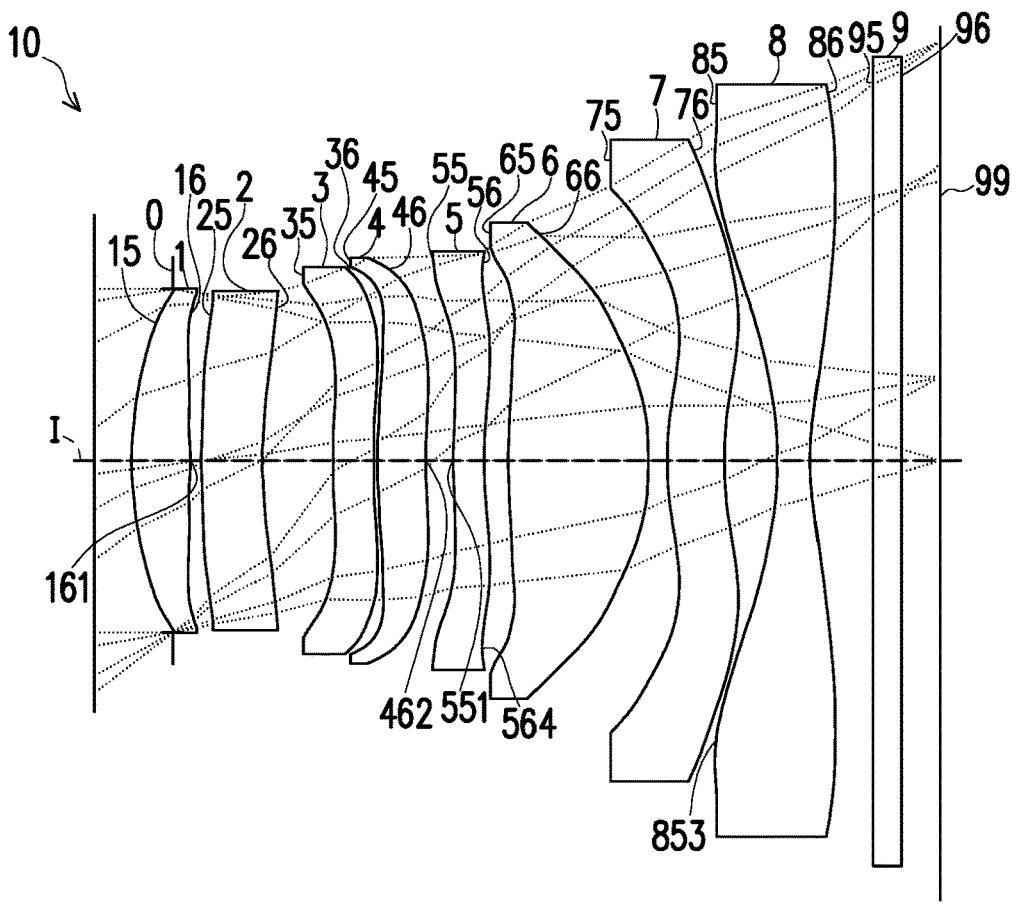
FIG. 10
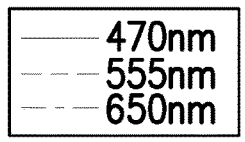
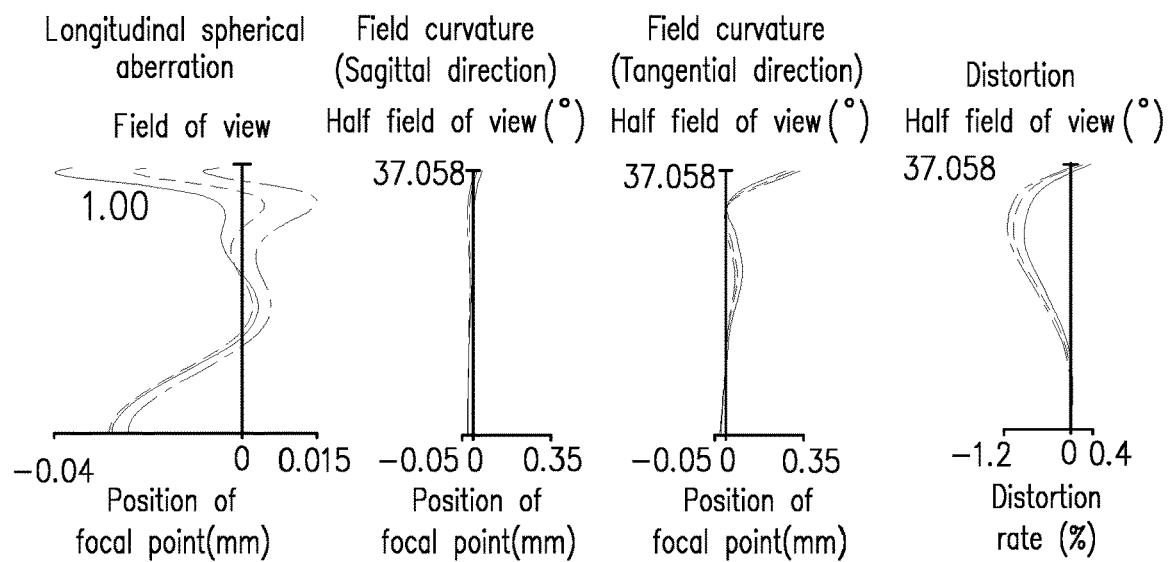
FIG. 11A  FIG. 11B  FIG. 11C  FIG. 11D

| Second embodiment ||||||
|---|---|---|---|---|---|
| Effective focal length= 4.260 mm, Half field of view=37.058°, System length=6.246 mm, F-number=1.600, Image height= 3.238 mm ||||||
| Element | Surface | Radius (mm) | Thickness (mm) | Refractive index | Abbe number | Focal Length (mm) |
| Object | | Infinity | Infinity | | | |
| Aperture 0 | | Infinity | -0.316 | | | |
| First lens element 1 | Object-side surface 15 | 3.229 | 0.454 | 1.545 | 55.987 | 5.033 |
| | Image-side surface 16 | -17.577 | 0.086 | | | |
| Second lens element 2 | Object-side surface 25 | 8.120 | 0.471 | 1.661 | 20.373 | -11.760 |
| | Image-side surface 26 | 3.898 | 0.553 | | | |
| Third lens element 3 | Object-side surface 35 | 8.111 | 0.311 | 1.661 | 20.373 | -25.555 |
| | Image-side surface 36 | 5.412 | 0.032 | | | |
| Fourth lens element 4 | Object-side surface 45 | 6.271 | 0.381 | 1.545 | 55.987 | 39.734 |
| | Image-side surface 46 | 8.629 | 0.206 | | | |
| Fifth lens element 5 | Object-side surface 55 | 5.307 | 0.243 | 1.661 | 20.373 | -21.015 |
| | Image-side surface 56 | 3.779 | 0.185 | | | |
| Sixth lens element 6 | Object-side surface 65 | 7.235 | 1.086 | 1.545 | 55.987 | 2.992 |
| | Image-side surface 66 | -2.000 | 0.148 | | | |
| Seventh lens element 7 | Object-side surface 75 | 2.614 | 0.442 | 1.545 | 55.987 | 44.395 |
| | Image-side surface 76 | 2.754 | 0.413 | | | |
| Eighth lens element 8 | Object-side surface 85 | -2.986 | 0.258 | 1.545 | 55.987 | -2.906 |
| | Image-side surface 86 | 3.492 | 0.488 | | | |
| Filter 9 | Object-side surface 95 | Infinity | 0.210 | 1.517 | 64.167 | |
| | Image-side surface 96 | Infinity | 0.280 | | | |
| | Image plane 99 | Infinity | | | | |

FIG. 12

| Surface | K | $a_2$ | $a_4$ | $a_6$ | $a_8$ |
|---|---|---|---|---|---|
| 15 | 0.000000E+00 | 0.000000E+00 | 1.463527E-03 | 1.253685E-03 | -4.140183E-04 |
| 16 | 0.000000E+00 | 0.000000E+00 | 1.238092E-02 | -4.614243E-04 | 5.696152E-03 |
| 25 | 0.000000E+00 | 0.000000E+00 | -2.133483E-02 | 1.089580E-02 | 2.192374E-03 |
| 26 | 0.000000E+00 | 0.000000E+00 | -5.202901E-02 | 5.217986E-03 | 6.689657E-03 |
| 35 | 0.000000E+00 | 0.000000E+00 | -7.595323E-02 | -2.429379E-02 | 6.121794E-05 |
| 36 | 0.000000E+00 | 0.000000E+00 | -4.994818E-02 | -1.669265E-02 | -9.159992E-03 |
| 45 | 0.000000E+00 | 0.000000E+00 | -3.979915E-02 | 3.766837E-03 | -4.336817E-03 |
| 46 | 0.000000E+00 | 0.000000E+00 | -7.081030E-02 | -4.974745E-02 | 2.421129E-02 |
| 55 | 0.000000E+00 | 0.000000E+00 | -1.275796E-01 | -4.418619E-03 | 1.617828E-02 |
| 56 | 0.000000E+00 | 0.000000E+00 | -1.513169E-01 | 6.010742E-02 | -9.688462E-03 |
| 65 | 0.000000E+00 | 0.000000E+00 | -2.173527E-02 | 4.939077E-03 | -1.283522E-02 |
| 66 | 0.000000E+00 | 0.000000E+00 | 2.619731E-02 | -2.000544E-03 | -2.073687E-03 |
| 75 | 0.000000E+00 | 0.000000E+00 | -1.049074E-01 | -1.221382E-02 | 6.037156E-03 |
| 76 | 0.000000E+00 | 0.000000E+00 | -9.676552E-02 | 9.224470E-03 | 1.224282E-04 |
| 85 | 0.000000E+00 | 0.000000E+00 | 1.884694E-02 | -9.428382E-04 | 3.542524E-04 |
| 86 | 0.000000E+00 | 0.000000E+00 | -5.332036E-02 | 1.034364E-02 | -1.198557E-03 |
| Surface | $a_{10}$ | $a_{12}$ | $a_{14}$ | $a_{16}$ | |
| 15 | 5.539778E-04 | 9.093419E-04 | 1.221942E-04 | -6.678219E-06 | |
| 16 | 1.539830E-03 | -1.700636E-03 | 3.278635E-04 | -1.842793E-04 | |
| 25 | 2.914068E-03 | -2.978247E-04 | -2.502438E-03 | 7.118327E-04 | |
| 26 | 5.406956E-04 | -2.155348E-03 | -2.034790E-03 | 1.272367E-03 | |
| 35 | -5.540471E-04 | -3.826774E-06 | 2.347214E-03 | -6.249403E-04 | |
| 36 | 2.559376E-03 | 1.805295E-03 | 4.517216E-04 | -4.004086E-04 | |
| 45 | 1.508758E-03 | 1.337101E-03 | -2.054900E-04 | -4.816779E-04 | |
| 46 | 1.084926E-02 | -3.123044E-03 | -2.734585E-03 | 6.683443E-04 | |
| 55 | 1.064941E-03 | -1.053623E-03 | -1.117004E-04 | 3.881418E-05 | |
| 56 | -2.868373E-03 | 5.131849E-04 | 6.642454E-04 | -1.470584E-04 | |
| 65 | 3.974812E-03 | -1.783993E-04 | -4.445758E-04 | 1.374635E-04 | |
| 66 | 3.091957E-04 | 7.400678E-05 | 2.989737E-05 | -4.016600E-06 | |
| 75 | 6.046738E-04 | -2.337800E-04 | -2.057700E-05 | 4.957510E-06 | |
| 76 | 5.841905E-05 | -1.832643E-05 | -1.515458E-06 | 2.403415E-07 | |
| 85 | 4.370609E-06 | -2.612306E-06 | -6.904430E-07 | 8.346076E-08 | |
| 86 | 4.703866E-05 | 1.454296E-06 | -4.649097E-08 | -6.857444E-09 | |

FIG. 13

| Third embodiment ||||||
|---|---|---|---|---|---|
| Effective focal length= 4.346 mm, Half field of view=36.925°, System length=5.556 mm, F-number=1.600, Image height=3.238 mm ||||||
| Element | Surface | Radius (mm) | Thickness (mm) | Refractive index | Abbe number | Focal Length (mm) |
| Object | | Infinity | Infinity | | | |
| Aperture 0 | | Infinity | -0.490 | | | |
| First lens element 1 | Object-side surface 15 | 2.201 | 0.652 | 1.545 | 55.987 | 4.147 |
| | Image-side surface 16 | 68.956 | 0.155 | | | |
| Second lens element 2 | Object-side surface 25 | 10.589 | 0.220 | 1.661 | 20.373 | -9.452 |
| | Image-side surface 26 | 3.919 | 0.415 | | | |
| Third lens element 3 | Object-side surface 35 | 18.420 | 0.240 | 1.661 | 20.373 | -29.057 |
| | Image-side surface 36 | 9.396 | 0.199 | | | |
| Fourth lens element 4 | Object-side surface 45 | 9.876 | 0.591 | 1.545 | 55.987 | 11.485 |
| | Image-side surface 46 | -16.838 | 0.137 | | | |
| Fifth lens element 5 | Object-side surface 55 | 107.426 | 0.270 | 1.661 | 20.373 | -26.532 |
| | Image-side surface 56 | 15.181 | 0.211 | | | |
| Sixth lens element 6 | Object-side surface 65 | -33.191 | 0.264 | 1.545 | 55.987 | 4.152 |
| | Image-side surface 66 | -2.129 | 0.093 | | | |
| Seventh lens element 7 | Object-side surface 75 | 3.137 | 0.300 | 1.545 | 55.987 | 66.530 |
| | Image-side surface 76 | 3.318 | 0.511 | | | |
| Eighth lens element 8 | Object-side surface 85 | -2.741 | 0.320 | 1.545 | 55.987 | -2.923 |
| | Image-side surface 86 | 3.983 | 0.488 | | | |
| Filter 9 | Object-side surface 95 | Infinity | 0.210 | 1.517 | 64.167 | |
| | Image-side surface 96 | Infinity | 0.280 | | | |
| | Image plane 99 | Infinity | | | | |

FIG. 16

| Surface | K | $a_2$ | $a_4$ | $a_6$ | $a_8$ |
|---|---|---|---|---|---|
| 15 | 0.000000E+00 | 0.000000E+00 | 2.347547E-03 | 3.558092E-03 | -1.409875E-03 |
| 16 | 0.000000E+00 | 0.000000E+00 | 5.129092E-03 | -3.275382E-03 | 4.458118E-03 |
| 25 | 0.000000E+00 | 0.000000E+00 | -3.339467E-02 | 8.838537E-03 | 2.181152E-03 |
| 26 | 0.000000E+00 | 0.000000E+00 | -3.683445E-02 | 5.287062E-03 | 3.894787E-03 |
| 35 | 0.000000E+00 | 0.000000E+00 | -6.649305E-02 | -2.878447E-02 | -3.272463E-03 |
| 36 | 0.000000E+00 | 0.000000E+00 | -6.528736E-02 | -1.694182E-02 | -7.458549E-03 |
| 45 | 0.000000E+00 | 0.000000E+00 | -4.302779E-02 | -1.742006E-03 | -3.950941E-03 |
| 46 | 0.000000E+00 | 0.000000E+00 | -8.333384E-02 | -4.368058E-02 | 2.138138E-02 |
| 55 | 0.000000E+00 | 0.000000E+00 | -1.181154E-01 | -5.773443E-03 | 1.537627E-02 |
| 56 | 0.000000E+00 | 0.000000E+00 | -1.604384E-01 | 5.518761E-02 | -9.642294E-03 |
| 65 | 0.000000E+00 | 0.000000E+00 | -4.698580E-02 | 1.429624E-02 | -1.468373E-02 |
| 66 | 0.000000E+00 | 0.000000E+00 | 6.561686E-02 | -7.958878E-03 | -9.964125E-04 |
| 75 | 0.000000E+00 | 0.000000E+00 | -1.381122E-01 | -7.212197E-03 | 7.187146E-03 |
| 76 | 0.000000E+00 | 0.000000E+00 | -1.060985E-01 | 8.904938E-03 | 1.417624E-04 |
| 85 | 0.000000E+00 | 0.000000E+00 | 1.819828E-02 | -8.167203E-04 | 3.901343E-04 |
| 86 | 0.000000E+00 | 0.000000E+00 | -5.708465E-02 | 1.076144E-02 | -1.214260E-03 |
| Surface | $a_{10}$ | $a_{12}$ | $a_{14}$ | $a_{16}$ | |
| 15 | 5.752890E-05 | 4.503719E-04 | 4.978830E-05 | 4.465125E-05 | |
| 16 | 2.999130E-04 | -9.221378E-04 | 1.941986E-04 | 2.172236E-07 | |
| 25 | 2.441673E-03 | -1.666446E-03 | -3.411462E-03 | 1.604832E-03 | |
| 26 | -1.511519E-03 | -2.774537E-03 | -1.949388E-03 | 1.052574E-03 | |
| 35 | -3.686742E-03 | -8.073273E-04 | 2.396140E-03 | -1.953530E-03 | |
| 36 | 3.916725E-03 | 2.740771E-03 | 6.872728E-04 | -9.818523E-04 | |
| 45 | 2.968071E-03 | 2.257445E-03 | 2.264038E-04 | -3.149956E-04 | |
| 46 | 8.363851E-03 | -3.391129E-03 | -2.137315E-03 | 1.169018E-03 | |
| 55 | 1.324171E-03 | -8.545164E-04 | -5.465704E-05 | 5.104215E-05 | |
| 56 | -2.559310E-03 | 6.667284E-04 | 7.284239E-04 | -1.289472E-04 | |
| 65 | 3.204878E-03 | -2.429425E-04 | -3.958992E-04 | 1.736206E-04 | |
| 66 | 7.207914E-04 | 1.195223E-04 | 1.599664E-05 | -1.506225E-05 | |
| 75 | 7.235190E-04 | -2.277956E-04 | -2.291090E-05 | 3.595826E-06 | |
| 76 | 7.527061E-05 | -1.424744E-05 | -8.042935E-07 | 3.430448E-07 | |
| 85 | 7.319021E-06 | -2.337916E-06 | -6.378423E-07 | 9.426554E-08 | |
| 86 | 3.894796E-05 | 1.354525E-06 | 1.452760E-08 | -2.196355E-09 | |

FIG. 17

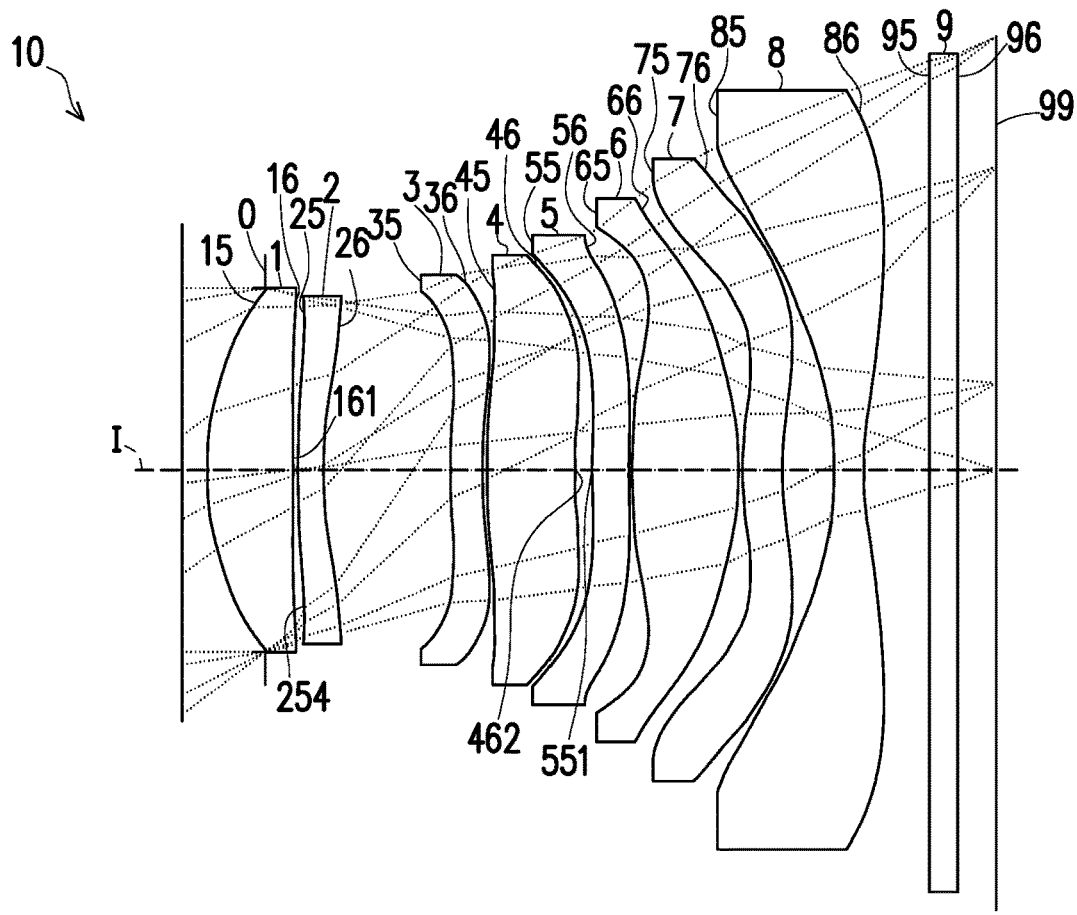
FIG. 18
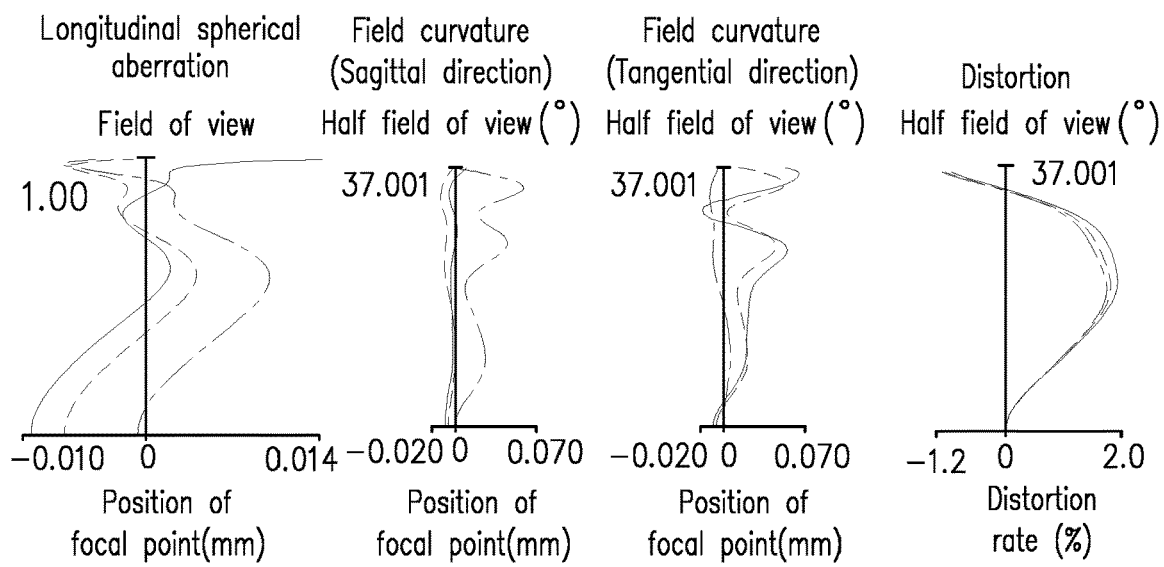
FIG. 19A   FIG. 19B   FIG. 19C   FIG. 19D

| Fourth embodiment | | | | | | |
|---|---|---|---|---|---|---|
| Effective focal length= 4.335 mm, Half field of view=37.001°, System length=5.884 mm, F-number= 1.600, Image height=3.238 mm | | | | | | |
| Element | Surface | Radius (mm) | Thickness (mm) | Refractive index | Abbe number | Focal Length (mm) |
| Object | | Infinity | Infinity | | | |
| Aperture 0 | | Infinity | -0.428 | | | |
| First lens element 1 | Object-side surface 15 | 2.409 | 0.642 | 1.545 | 55.987 | 4.248 |
| | Image-side surface 16 | -56.978 | 0.030 | | | |
| Second lens element 2 | Object-side surface 25 | 5.972 | 0.198 | 1.661 | 20.373 | -11.469 |
| | Image-side surface 26 | 3.310 | 0.951 | | | |
| Third lens element 3 | Object-side surface 35 | 7.765 | 0.240 | 1.661 | 20.373 | -16.300 |
| | Image-side surface 36 | 4.474 | 0.036 | | | |
| Fourth lens element 4 | Object-side surface 45 | 5.675 | 0.652 | 1.545 | 55.987 | -77.661 |
| | Image-side surface 46 | 4.802 | 0.125 | | | |
| Fifth lens element 5 | Object-side surface 55 | 10.483 | 0.270 | 1.661 | 20.373 | -119.995 |
| | Image-side surface 56 | 9.174 | 0.030 | | | |
| Sixth lens element 6 | Object-side surface 65 | 4.337 | 0.800 | 1.545 | 55.987 | 2.939 |
| | Image-side surface 66 | -2.383 | 0.028 | | | |
| Seventh lens element 7 | Object-side surface 75 | 2.636 | 0.300 | 1.545 | 55.987 | 24.194 |
| | Image-side surface 76 | 3.161 | 0.384 | | | |
| Eighth lens element 8 | Object-side surface 85 | -2.722 | 0.221 | 1.545 | 55.987 | -2.626 |
| | Image-side surface 86 | 3.119 | 0.488 | | | |
| Filter 9 | Object-side surface 95 | Infinity | 0.210 | 1.517 | 64.167 | |
| | Image-side surface 96 | Infinity | 0.280 | | | |
| | Image plane 99 | Infinity | | | | |

FIG. 20

| Surface | K | $a_2$ | $a_4$ | $a_6$ | $a_8$ |
|---|---|---|---|---|---|
| 15 | 0.000000E+00 | 0.000000E+00 | 2.508011E-03 | 8.215516E-04 | 1.834407E-05 |
| 16 | 0.000000E+00 | 0.000000E+00 | 1.445095E-02 | -6.722410E-03 | 2.441045E-03 |
| 25 | 0.000000E+00 | 0.000000E+00 | -4.115894E-02 | 3.099994E-03 | 1.163611E-03 |
| 26 | 0.000000E+00 | 0.000000E+00 | -5.764867E-02 | 6.689332E-03 | 4.375843E-03 |
| 35 | 0.000000E+00 | 0.000000E+00 | -5.676579E-02 | -1.758373E-02 | -3.366465E-03 |
| 36 | 0.000000E+00 | 0.000000E+00 | -5.177723E-02 | -1.460039E-02 | -1.117523E-02 |
| 45 | 0.000000E+00 | 0.000000E+00 | -3.764094E-02 | 2.330233E-03 | -4.329075E-03 |
| 46 | 0.000000E+00 | 0.000000E+00 | -8.422462E-02 | -5.689254E-02 | 2.083127E-02 |
| 55 | 0.000000E+00 | 0.000000E+00 | -1.117703E-01 | -1.051046E-02 | 1.470871E-02 |
| 56 | 0.000000E+00 | 0.000000E+00 | -1.373344E-01 | 5.941032E-02 | -1.160375E-02 |
| 65 | 0.000000E+00 | 0.000000E+00 | -1.122920E-02 | 1.320843E-03 | -1.395322E-02 |
| 66 | 0.000000E+00 | 0.000000E+00 | 5.509784E-02 | -1.184419E-02 | -2.743673E-03 |
| 75 | 0.000000E+00 | 0.000000E+00 | -1.520955E-01 | -1.182320E-02 | 7.173898E-03 |
| 76 | 0.000000E+00 | 0.000000E+00 | -1.056718E-01 | 9.491217E-03 | 9.957265E-06 |
| 85 | 0.000000E+00 | 0.000000E+00 | 9.425775E-03 | -5.885483E-04 | 3.820339E-04 |
| 86 | 0.000000E+00 | 0.000000E+00 | -6.969513E-02 | 1.272646E-02 | -1.299653E-03 |
| Surface | $a_{10}$ | $a_{12}$ | $a_{14}$ | $a_{16}$ | |
| 15 | 5.428212E-04 | 1.031426E-04 | -2.299008E-04 | 1.617781E-04 | |
| 16 | 1.232612E-03 | -2.422652E-04 | 6.486780E-05 | -1.139495E-04 | |
| 25 | 2.809958E-03 | -2.263283E-04 | -2.382124E-03 | 7.716485E-04 | |
| 26 | -8.902376E-04 | -1.363468E-03 | -9.037476E-04 | 6.879526E-04 | |
| 35 | -2.233332E-03 | -1.228781E-03 | 1.015487E-03 | -1.971020E-05 | |
| 36 | 2.829840E-04 | 1.421129E-03 | 9.154632E-04 | -3.965724E-04 | |
| 45 | 1.527571E-03 | 1.092688E-03 | -2.450871E-04 | -7.195467E-05 | |
| 46 | 1.105136E-02 | -2.438235E-03 | -2.379350E-03 | 6.320759E-04 | |
| 55 | 1.218496E-04 | -1.528230E-03 | -2.244821E-04 | 1.627262E-04 | |
| 56 | -3.516773E-03 | 3.938018E-04 | 6.805040E-04 | -1.279940E-04 | |
| 65 | 4.422239E-03 | 2.179556E-05 | -4.674207E-04 | 9.215927E-05 | |
| 66 | 5.132844E-04 | 1.115706E-04 | 2.741051E-05 | -8.082454E-06 | |
| 75 | 7.706522E-04 | -2.175367E-04 | -2.116382E-05 | 3.904902E-06 | |
| 76 | 3.715917E-05 | -1.747564E-05 | -7.159188E-07 | 3.603698E-07 | |
| 85 | 1.911861E-06 | -3.218053E-06 | -6.094783E-07 | 1.512908E-07 | |
| 86 | 3.147873E-05 | 1.215265E-06 | 1.530263E-08 | -3.164540E-09 | |

FIG. 21

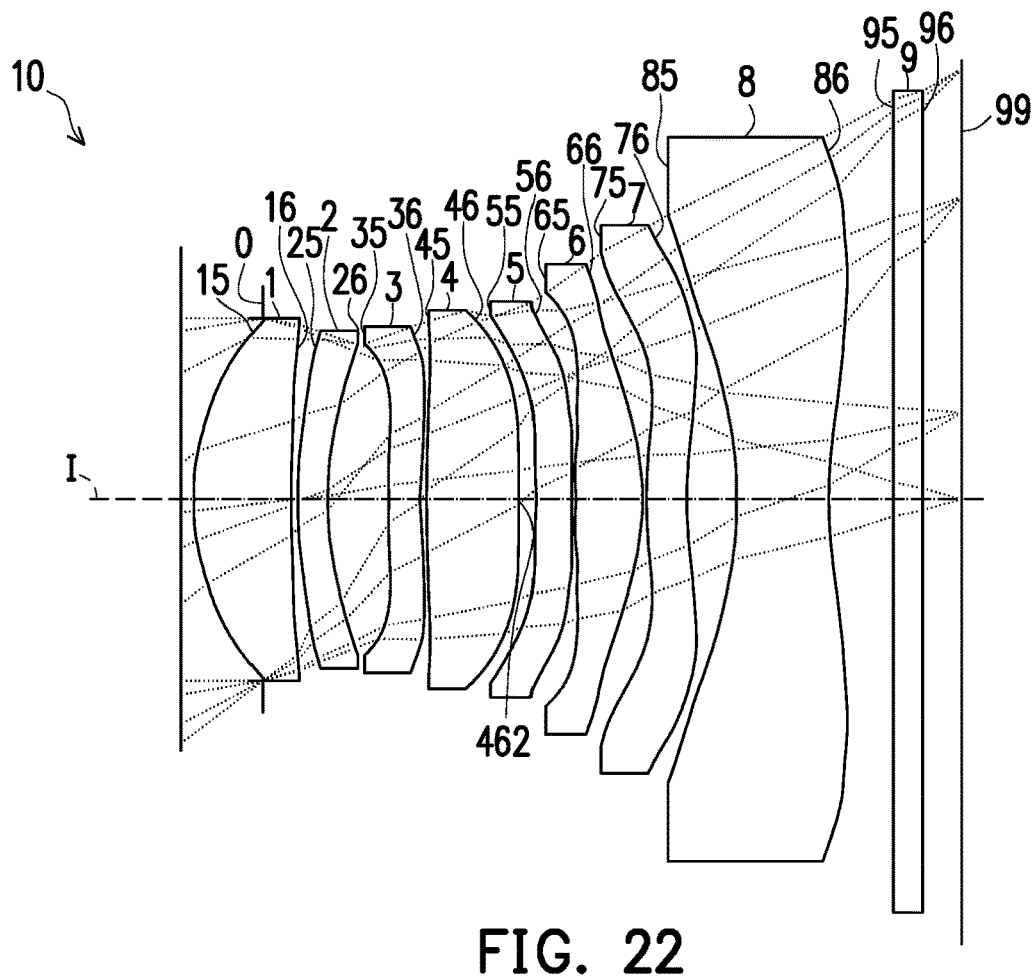
FIG. 22
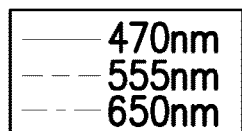
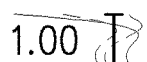
FIG. 23A
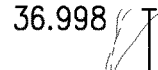
FIG. 23B
FIG. 23C
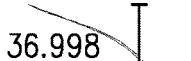
FIG. 23D

| Fifth embodiment ||||||
|---|---|---|---|---|---|
| Effective focal length= 4.364 mm, Half field of view=36.998°, System length= 5.727 mm, F-number=1.600, Image height=3.238 mm ||||||
| Element | Surface | Radius (mm) | Thickness (mm) | Refractive index | Abbe number | Focal Length (mm) |
| Object | | Infinity | Infinity | | | |
| Aperture 0 | | Infinity | -0.505 | | | |
| First lens element 1 | Object-side surface 15 | 2.056 | 0.726 | 1.545 | 55.987 | 4.136 |
| | Image-side surface 16 | 19.938 | 0.048 | | | |
| Second lens element 2 | Object-side surface 25 | 4.117 | 0.220 | 1.661 | 20.373 | -10.226 |
| | Image-side surface 26 | 2.513 | 0.458 | | | |
| Third lens element 3 | Object-side surface 35 | 7.990 | 0.240 | 1.661 | 20.373 | -20.764 |
| | Image-side surface 36 | 5.006 | 0.047 | | | |
| Fourth lens element 4 | Object-side surface 45 | 11.949 | 0.685 | 1.545 | 55.987 | 30.305 |
| | Image-side surface 46 | 42.081 | 0.127 | | | |
| Fifth lens element 5 | Object-side surface 55 | -223.365 | 0.270 | 1.661 | 20.373 | -22.611 |
| | Image-side surface 56 | 16.185 | 0.030 | | | |
| Sixth lens element 6 | Object-side surface 65 | 13.534 | 0.501 | 1.545 | 55.987 | 3.070 |
| | Image-side surface 66 | -1.889 | 0.030 | | | |
| Seventh lens element 7 | Object-side surface 75 | 3.338 | 0.300 | 1.545 | 55.987 | -223.217 |
| | Image-side surface 76 | 3.146 | 0.376 | | | |
| Eighth lens element 8 | Object-side surface 85 | -3.178 | 0.691 | 1.545 | 55.987 | -3.030 |
| | Image-side surface 86 | 3.718 | 0.488 | | | |
| Filter 9 | Object-side surface 95 | Infinity | 0.210 | 1.517 | 64.167 | |
| | Image-side surface 96 | Infinity | 0.280 | | | |
| | Image plane 99 | Infinity | | | | |

FIG. 24

| Surface | K | $a_2$ | $a_4$ | $a_6$ | $a_8$ |
|---|---|---|---|---|---|
| 15 | 0.000000E+00 | 0.000000E+00 | 1.886519E-03 | 1.640547E-03 | -1.391418E-03 |
| 16 | 0.000000E+00 | 0.000000E+00 | 7.765345E-03 | -4.342729E-03 | 3.334135E-03 |
| 25 | 0.000000E+00 | 0.000000E+00 | -2.999886E-02 | 8.187180E-03 | 1.243151E-03 |
| 26 | 0.000000E+00 | 0.000000E+00 | -4.159512E-02 | 7.035514E-03 | 3.873252E-03 |
| 35 | 0.000000E+00 | 0.000000E+00 | -7.715694E-02 | -3.364832E-02 | -3.268794E-03 |
| 36 | 0.000000E+00 | 0.000000E+00 | -6.449864E-02 | -1.792008E-02 | -8.678377E-03 |
| 45 | 0.000000E+00 | 0.000000E+00 | -2.829491E-02 | 5.446828E-03 | -2.687068E-03 |
| 46 | 0.000000E+00 | 0.000000E+00 | -8.165720E-02 | -5.302647E-02 | 2.045683E-02 |
| 55 | 0.000000E+00 | 0.000000E+00 | -1.194792E-01 | -9.174720E-03 | 1.554811E-02 |
| 56 | 0.000000E+00 | 0.000000E+00 | -1.640583E-01 | 5.761820E-02 | -1.104603E-02 |
| 65 | 0.000000E+00 | 0.000000E+00 | -1.557982E-02 | 3.596513E-03 | -1.468840E-02 |
| 66 | 0.000000E+00 | 0.000000E+00 | 9.377471E-02 | -7.731513E-03 | -2.092194E-03 |
| 75 | 0.000000E+00 | 0.000000E+00 | -1.428087E-01 | -3.807310E-03 | 7.931152E-03 |
| 76 | 0.000000E+00 | 0.000000E+00 | -9.949350E-02 | 8.897771E-03 | 2.989805E-04 |
| 85 | 0.000000E+00 | 0.000000E+00 | 1.195384E-02 | -5.097064E-04 | 4.324480E-04 |
| 86 | 0.000000E+00 | 0.000000E+00 | -5.429209E-02 | 1.015577E-02 | -1.164298E-03 |
| Surface | $a_{10}$ | $a_{12}$ | $a_{14}$ | $a_{16}$ | |
| 15 | 2.114758E-04 | 5.290675E-04 | -1.064538E-05 | -1.160463E-04 | |
| 16 | -1.508490E-04 | -1.164822E-03 | 6.422943E-05 | 1.142431E-04 | |
| 25 | 2.144454E-03 | -1.074869E-03 | -2.689928E-03 | 1.620115E-03 | |
| 26 | -1.805401E-03 | -2.217739E-03 | -1.161434E-03 | 1.102055E-03 | |
| 35 | -3.257668E-03 | -2.489308E-03 | 9.523429E-04 | 4.362658E-04 | |
| 36 | 3.478230E-03 | 2.585390E-03 | 7.708465E-04 | -6.433942E-04 | |
| 45 | 2.085168E-03 | 1.161122E-03 | -3.895954E-04 | -2.548264E-04 | |
| 46 | 9.865599E-03 | -2.666388E-03 | -2.262469E-03 | 6.215744E-04 | |
| 55 | 9.530200E-04 | -1.305939E-03 | -2.263410E-04 | 1.575148E-04 | |
| 56 | -3.014189E-03 | 6.970020E-04 | 7.948452E-04 | -1.005684E-04 | |
| 65 | 3.439580E-03 | -2.503907E-04 | -4.214277E-04 | 1.710299E-04 | |
| 66 | 7.425970E-04 | 1.486214E-04 | 2.341841E-05 | -1.276592E-05 | |
| 75 | 7.562591E-04 | -2.405351E-04 | -2.837998E-05 | 1.698505E-06 | |
| 76 | 5.630595E-05 | -2.047161E-05 | -1.484596E-06 | 3.324825E-07 | |
| 85 | 4.125202E-06 | -4.188245E-06 | -1.155358E-06 | -2.175939E-08 | |
| 86 | 4.629503E-05 | 1.160814E-06 | -6.259676E-08 | -3.398215E-09 | |

FIG. 25

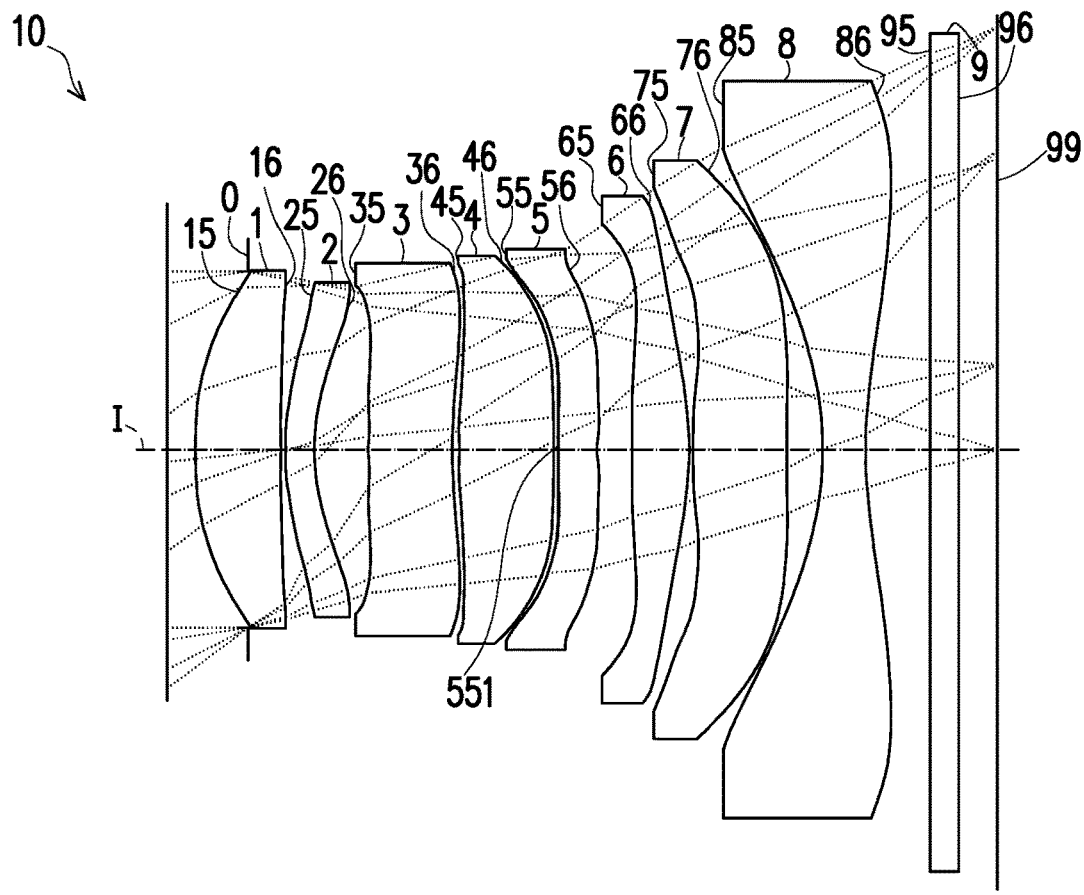
FIG. 26
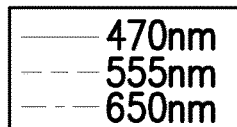
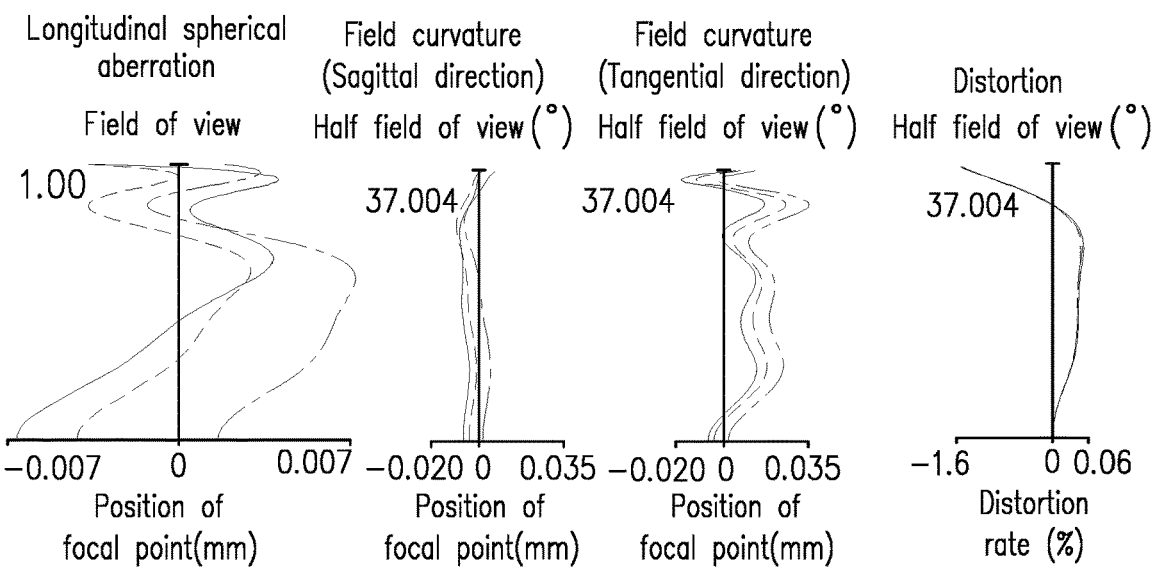
FIG. 27A   FIG. 27B   FIG. 27C   FIG. 27D

| Sixth embodiment |||||||
|---|---|---|---|---|---|---|
| Effective focal length= 4.355 mm, Half field of view=37.004°, System length= 6.002 mm, F-number= 1.600, Image height=3.238 mm |||||||
| Element | Surface | Radius (mm) | Thickness (mm) | Refractive index | Abbe number | Focal Length (mm) |
| Object | | Infinity | Infinity | | | |
| Aperture 0 | | Infinity | -0.404 | | | |
| First lens element 1 | Object-side surface 15 | 2.503 | 0.645 | 1.545 | 55.987 | 4.797 |
| | Image-side surface 16 | 50.579 | 0.030 | | | |
| Second lens element 2 | Object-side surface 25 | 2.246 | 0.220 | 1.661 | 20.373 | -12.760 |
| | Image-side surface 26 | 1.708 | 0.403 | | | |
| Third lens element 3 | Object-side surface 35 | 9.517 | 0.634 | 1.661 | 20.373 | -13.082 |
| | Image-side surface 36 | 4.431 | 0.051 | | | |
| Fourth lens element 4 | Object-side surface 45 | 6.358 | 0.710 | 1.545 | 55.987 | 9.809 |
| | Image-side surface 46 | -32.737 | 0.030 | | | |
| Fifth lens element 5 | Object-side surface 55 | 14.464 | 0.292 | 1.661 | 20.373 | -38.083 |
| | Image-side surface 56 | 9.142 | 0.259 | | | |
| Sixth lens element 6 | Object-side surface 65 | 21.026 | 0.429 | 1.545 | 55.987 | 4.608 |
| | Image-side surface 66 | -2.839 | 0.030 | | | |
| Seventh lens element 7 | Object-side surface 75 | 4.628 | 0.702 | 1.545 | 55.987 | 9.955 |
| | Image-side surface 76 | 29.386 | 0.269 | | | |
| Eighth lens element 8 | Object-side surface 85 | -2.548 | 0.320 | 1.545 | 55.987 | -2.734 |
| | Image-side surface 86 | 3.769 | 0.488 | | | |
| Filter 9 | Object-side surface 95 | Infinity | 0.210 | 1.517 | 64.167 | |
| | Image-side surface 96 | Infinity | 0.280 | | | |
| | Image plane 99 | Infinity | | | | |

FIG. 28

| Surface | K | $a_2$ | $a_4$ | $a_6$ | $a_8$ |
|---|---|---|---|---|---|
| 15 | 0.000000E+00 | 0.000000E+00 | 7.328110E-03 | -1.115757E-03 | -1.119836E-03 |
| 16 | 0.000000E+00 | 0.000000E+00 | 1.258534E-02 | -9.709851E-03 | 3.393415E-03 |
| 25 | 0.000000E+00 | 0.000000E+00 | -7.406460E-02 | 4.655988E-03 | -1.869266E-03 |
| 26 | 0.000000E+00 | 0.000000E+00 | -1.021106E-01 | 3.104077E-03 | 2.701315E-03 |
| 35 | 0.000000E+00 | 0.000000E+00 | -3.095750E-02 | -3.661933E-03 | -6.313374E-03 |
| 36 | 0.000000E+00 | 0.000000E+00 | -4.980947E-02 | 3.811371E-04 | -9.621137E-03 |
| 45 | 0.000000E+00 | 0.000000E+00 | -3.568966E-02 | -9.377961E-03 | -3.553968E-03 |
| 46 | 0.000000E+00 | 0.000000E+00 | -4.240219E-02 | -8.094987E-02 | 2.605328E-02 |
| 55 | 0.000000E+00 | 0.000000E+00 | -1.297302E-01 | -1.307470E-02 | 1.158088E-02 |
| 56 | 0.000000E+00 | 0.000000E+00 | -1.521539E-01 | 5.598878E-02 | -1.743197E-02 |
| 65 | 0.000000E+00 | 0.000000E+00 | 1.929859E-02 | -6.016857E-03 | -1.208603E-02 |
| 66 | 0.000000E+00 | 0.000000E+00 | 5.956161E-02 | -1.412023E-04 | -5.110055E-03 |
| 75 | 0.000000E+00 | 0.000000E+00 | -7.956027E-02 | -9.915113E-03 | 6.732372E-03 |
| 76 | 0.000000E+00 | 0.000000E+00 | -3.356333E-02 | -3.018034E-03 | 5.503560E-04 |
| 85 | 0.000000E+00 | 0.000000E+00 | 2.480424E-02 | -3.399467E-03 | 5.975880E-04 |
| 86 | 0.000000E+00 | 0.000000E+00 | -4.407715E-02 | 8.626846E-03 | -1.115287E-03 |
| Surface | $a_{10}$ | $a_{12}$ | $a_{14}$ | $a_{16}$ | |
| 15 | 1.368642E-03 | 2.349951E-04 | -4.764527E-04 | 1.154830E-04 | |
| 16 | 1.490707E-03 | -7.780799E-04 | -3.996351E-04 | 1.990675E-04 | |
| 25 | 3.920282E-03 | -4.317840E-04 | -2.004282E-03 | 8.736045E-04 | |
| 26 | -7.313420E-03 | -6.178439E-04 | 1.205674E-03 | -2.866685E-04 | |
| 35 | -3.682995E-03 | -2.263369E-03 | 1.503722E-03 | -3.079251E-04 | |
| 36 | 2.257722E-04 | 2.116010E-03 | 1.203895E-03 | -7.673507E-04 | |
| 45 | 5.092855E-03 | 2.364313E-03 | -5.194601E-04 | -5.212201E-04 | |
| 46 | 1.157162E-02 | -2.572362E-03 | -2.863479E-03 | 8.279258E-04 | |
| 55 | -8.741215E-04 | -1.266053E-03 | 1.532323E-03 | -3.081454E-04 | |
| 56 | -4.199878E-04 | 1.396125E-03 | 6.187952E-04 | -1.903532E-04 | |
| 65 | 4.230985E-03 | -2.310263E-04 | -3.292940E-04 | 8.059538E-05 | |
| 66 | 4.987869E-04 | 1.399808E-04 | 2.931155E-05 | -1.191742E-05 | |
| 75 | 3.764823E-04 | -2.402320E-04 | -1.636573E-05 | 4.613869E-06 | |
| 76 | 1.587867E-04 | -2.754194E-05 | -2.084512E-06 | 4.800680E-07 | |
| 85 | 1.404472E-05 | 1.489598E-06 | -5.242213E-07 | 2.034750E-08 | |
| 86 | 5.029353E-05 | 9.695317E-07 | -9.615779E-09 | -8.967886E-09 | |

FIG. 29

| Seventh embodiment ||||||
|---|---|---|---|---|---|
| Effective focal length= 4.364 mm, Half field of view= 37.001°, System length=5.479 mm, F-number= 1.600, Image height=3.238 mm ||||||
| Element | Surface | Radius (mm) | Thickness (mm) | Refractive index | Abbe number | Focal Length (mm) |
| Object | | Infinity | Infinity | | | |
| Aperture 0 | | Infinity | -0.532 | | | |
| First lens element 1 | Object-side surface 15 | 1.922 | 0.751 | 1.545 | 55.987 | 3.894 |
| | Image-side surface 16 | 17.231 | 0.030 | | | |
| Second lens element 2 | Object-side surface 25 | 4.203 | 0.220 | 1.661 | 20.373 | -10.034 |
| | Image-side surface 26 | 2.528 | 0.329 | | | |
| Third lens element 3 | Object-side surface 35 | 6.628 | 0.392 | 1.661 | 20.373 | -14.966 |
| | Image-side surface 36 | 3.889 | 0.057 | | | |
| Fourth lens element 4 | Object-side surface 45 | 6.868 | 0.598 | 1.545 | 55.987 | 10.389 |
| | Image-side surface 46 | -31.680 | 0.153 | | | |
| Fifth lens element 5 | Object-side surface 55 | 30.117 | 0.401 | 1.661 | 20.373 | -107.311 |
| | Image-side surface 56 | 21.086 | 0.143 | | | |
| Sixth lens element 6 | Object-side surface 65 | -6.679 | 0.294 | 1.545 | 55.987 | 6.439 |
| | Image-side surface 66 | -2.340 | 0.039 | | | |
| Seventh lens element 7 | Object-side surface 75 | 3.604 | 0.520 | 1.545 | 55.987 | 13.779 |
| | Image-side surface 76 | 6.564 | 0.255 | | | |
| Eighth lens element 8 | Object-side surface 85 | -2.841 | 0.320 | 1.545 | 55.987 | -3.049 |
| | Image-side surface 86 | 4.184 | 0.488 | | | |
| Filter 9 | Object-side surface 95 | Infinity | 0.210 | 1.517 | 64.167 | |
| | Image-side surface 96 | Infinity | 0.280 | | | |
| | Image plane 99 | Infinity | | | | |

FIG. 32

| Surface | K | $a_2$ | $a_4$ | $a_6$ | $a_8$ |
|---|---|---|---|---|---|
| 15 | 0.000000E+00 | 0.000000E+00 | -2.276571E-04 | 1.163006E-03 | -1.733635E-03 |
| 16 | 0.000000E+00 | 0.000000E+00 | 4.017654E-03 | -5.277148E-03 | 3.213911E-03 |
| 25 | 0.000000E+00 | 0.000000E+00 | -3.112340E-02 | 7.662949E-03 | 1.784697E-03 |
| 26 | 0.000000E+00 | 0.000000E+00 | -4.511450E-02 | 3.708416E-03 | 4.425494E-03 |
| 35 | 0.000000E+00 | 0.000000E+00 | -6.003668E-02 | -1.826120E-02 | -1.090545E-04 |
| 36 | 0.000000E+00 | 0.000000E+00 | -5.123501E-02 | -8.895849E-03 | -8.344046E-03 |
| 45 | 0.000000E+00 | 0.000000E+00 | -2.543214E-02 | -7.146332E-03 | -5.544236E-03 |
| 46 | 0.000000E+00 | 0.000000E+00 | -8.463719E-02 | -4.384194E-02 | 2.368306E-02 |
| 55 | 0.000000E+00 | 0.000000E+00 | -1.217837E-01 | -1.807322E-02 | 1.403579E-02 |
| 56 | 0.000000E+00 | 0.000000E+00 | -1.677522E-01 | 6.199023E-02 | -9.400109E-03 |
| 65 | 0.000000E+00 | 0.000000E+00 | -1.583539E-02 | 1.425398E-02 | -1.458093E-02 |
| 66 | 0.000000E+00 | 0.000000E+00 | 7.650672E-02 | -9.312877E-03 | -2.514590E-03 |
| 75 | 0.000000E+00 | 0.000000E+00 | -1.401537E-01 | -8.921817E-04 | 8.139361E-03 |
| 76 | 0.000000E+00 | 0.000000E+00 | -6.697444E-02 | 5.950788E-03 | 5.822269E-05 |
| 85 | 0.000000E+00 | 0.000000E+00 | 2.320245E-02 | -1.175514E-03 | 3.331974E-04 |
| 86 | 0.000000E+00 | 0.000000E+00 | -5.387946E-02 | 1.064741E-02 | -1.307809E-03 |
| Surface | $a_{10}$ | $a_{12}$ | $a_{14}$ | $a_{16}$ | |
| 15 | 3.194378E-05 | 3.908750E-04 | -6.076996E-05 | -7.830820E-05 | |
| 16 | 1.209477E-04 | -9.026556E-04 | 1.580054E-04 | 3.019030E-05 | |
| 25 | 3.179149E-03 | -3.198496E-04 | -2.462315E-03 | 1.254606E-03 | |
| 26 | -4.051519E-04 | -1.951784E-03 | -1.590730E-03 | 1.184477E-03 | |
| 35 | -3.197491E-03 | -1.994056E-03 | 1.574255E-03 | 1.283498E-05 | |
| 36 | 2.430445E-03 | 2.259966E-03 | 9.317602E-04 | -4.903272E-04 | |
| 45 | 3.947124E-03 | 2.143493E-03 | -7.769490E-05 | -2.768941E-04 | |
| 46 | 8.809399E-03 | -3.955739E-03 | -2.576939E-03 | 9.862731E-04 | |
| 55 | 2.099900E-03 | -2.949144E-04 | -1.867665E-04 | -7.296543E-04 | |
| 56 | -2.580535E-03 | 5.566000E-04 | 6.291349E-04 | -1.362843E-04 | |
| 65 | 2.029981E-03 | -2.776022E-04 | -2.471378E-04 | 1.468710E-04 | |
| 66 | 6.604932E-04 | 1.340867E-04 | 1.824370E-05 | -1.853789E-05 | |
| 75 | 6.062311E-04 | -2.896885E-04 | -3.609828E-05 | 1.878971E-06 | |
| 76 | 9.955963E-05 | -1.257216E-05 | -1.772196E-06 | 6.869864E-08 | |
| 85 | 3.709293E-06 | -2.330708E-06 | -6.117896E-07 | 9.614451E-08 | |
| 86 | 4.200701E-05 | 1.933529E-06 | 4.463698E-08 | 3.574181E-09 | |

FIG. 33

| Eighth embodiment |||||||
|---|---|---|---|---|---|---|
| Effective focal length= 4.273 mm, Half field of view=37.998°, System length=6.022 mm, F-number= 1.600, Image height= 3.238 mm |||||||
| Element | Surface | Radius (mm) | Thickness (mm) | Refractive index | Abbe number | Focal Length (mm) |
| Object | | Infinity | Infinity | | | |
| Aperture 0 | | Infinity | -0.390 | | | |
| First lens element 1 | Object-side surface 15 | 2.427 | 1.046 | 1.545 | 55.987 | 4.493 |
| | Image-side surface 16 | 188.594 | 0.028 | | | |
| Second lens element 2 | Object-side surface 25 | 5.652 | 0.220 | 1.661 | 20.373 | -9.353 |
| | Image-side surface 26 | 2.919 | 0.181 | | | |
| Third lens element 3 | Object-side surface 35 | 2.981 | 0.240 | 1.661 | 20.373 | -86.065 |
| | Image-side surface 36 | 2.743 | 0.112 | | | |
| Fourth lens element 4 | Object-side surface 45 | 14.221 | 1.355 | 1.545 | 55.987 | 15.312 |
| | Image-side surface 46 | -19.629 | 0.035 | | | |
| Fifth lens element 5 | Object-side surface 55 | -18.033 | 0.270 | 1.661 | 20.373 | -26.837 |
| | Image-side surface 56 | 2518.951 | 0.031 | | | |
| Sixth lens element 6 | Object-side surface 65 | 30.818 | 0.442 | 1.545 | 55.987 | 3.418 |
| | Image-side surface 66 | -1.978 | 0.039 | | | |
| Seventh lens element 7 | Object-side surface 75 | 2.880 | 0.300 | 1.545 | 55.987 | 24.229 |
| | Image-side surface 76 | 3.546 | 0.350 | | | |
| Eighth lens element 8 | Object-side surface 85 | -2.745 | 0.320 | 1.545 | 55.987 | -2.626 |
| | Image-side surface 86 | 3.127 | 0.488 | | | |
| Filter 9 | Object-side surface 95 | Infinity | 0.210 | 1.517 | 64.167 | |
| | Image-side surface 96 | Infinity | 0.356 | | | |
| | Image plane 99 | Infinity | | | | |

FIG. 36

| Surface | K | $a_2$ | $a_4$ | $a_6$ | $a_8$ |
|---|---|---|---|---|---|
| 15 | 0.000000E+00 | 0.000000E+00 | 1.189876E-03 | 2.355629E-03 | -1.237756E-03 |
| 16 | 0.000000E+00 | 0.000000E+00 | 2.022646E-03 | -4.041754E-03 | 3.881554E-03 |
| 25 | 0.000000E+00 | 0.000000E+00 | -4.217680E-02 | 1.510475E-03 | -2.107204E-03 |
| 26 | 0.000000E+00 | 0.000000E+00 | -5.945194E-02 | -8.468501E-03 | -2.246003E-04 |
| 35 | 0.000000E+00 | 0.000000E+00 | -8.203165E-02 | -2.338564E-02 | -2.213808E-03 |
| 36 | 0.000000E+00 | 0.000000E+00 | -6.751480E-02 | -1.360622E-02 | -6.985812E-03 |
| 45 | 0.000000E+00 | 0.000000E+00 | -9.614960E-03 | 5.271064E-04 | -4.988023E-03 |
| 46 | 0.000000E+00 | 0.000000E+00 | -8.923358E-02 | -4.964319E-02 | 2.215495E-02 |
| 55 | 0.000000E+00 | 0.000000E+00 | -1.239014E-01 | -7.556111E-03 | 1.652485E-02 |
| 56 | 0.000000E+00 | 0.000000E+00 | -1.523707E-01 | 5.805565E-02 | -1.088013E-02 |
| 65 | 0.000000E+00 | 0.000000E+00 | -3.222616E-02 | 9.316734E-03 | -1.266104E-02 |
| 66 | 0.000000E+00 | 0.000000E+00 | 8.407624E-02 | -8.441102E-03 | -2.430563E-03 |
| 75 | 0.000000E+00 | 0.000000E+00 | -1.406406E-01 | -7.154564E-03 | 7.456522E-03 |
| 76 | 0.000000E+00 | 0.000000E+00 | -8.872327E-02 | 9.097004E-03 | 1.001531E-04 |
| 85 | 0.000000E+00 | 0.000000E+00 | 2.339597E-02 | -8.195544E-04 | 3.510877E-04 |
| 86 | 0.000000E+00 | 0.000000E+00 | -6.392943E-02 | 1.124077E-02 | -1.240822E-03 |
| Surface | $a_{10}$ | $a_{12}$ | $a_{14}$ | $a_{16}$ | |
| 15 | -1.403977E-05 | 4.026137E-04 | 6.154891E-06 | -5.046967E-05 | |
| 16 | -4.101311E-04 | -1.801682E-03 | -2.627962E-04 | 3.967226E-04 | |
| 25 | 1.182013E-03 | -7.089237E-04 | -2.316051E-03 | 1.122838E-03 | |
| 26 | -2.346547E-03 | -2.702906E-03 | -1.663064E-03 | 1.326392E-03 | |
| 35 | -3.925192E-03 | -2.392294E-03 | 1.002341E-03 | -1.507011E-04 | |
| 36 | 3.756114E-03 | 2.416492E-03 | 5.716126E-04 | -8.125542E-04 | |
| 45 | 1.932866E-03 | 1.636231E-03 | -8.552744E-05 | -3.085950E-04 | |
| 46 | 1.040796E-02 | -2.837244E-03 | -2.434816E-03 | 7.266206E-04 | |
| 55 | 1.025978E-03 | -1.289995E-03 | -2.299879E-04 | 1.032350E-03 | |
| 56 | -2.994315E-03 | 5.815281E-04 | 7.116564E-04 | -1.347823E-04 | |
| 65 | 3.521340E-03 | -2.968243E-04 | -4.511163E-04 | 1.427673E-04 | |
| 66 | 6.508277E-04 | 1.421052E-04 | 2.676686E-05 | -1.088236E-05 | |
| 75 | 7.096502E-04 | -2.386425E-04 | -2.530261E-05 | 3.329867E-06 | |
| 76 | 6.595904E-05 | -1.656090E-05 | -1.325876E-06 | 2.170960E-07 | |
| 85 | 3.939995E-06 | -2.357675E-06 | -6.024301E-07 | 9.965032E-08 | |
| 86 | 4.042620E-05 | 1.354800E-06 | -1.299213E-08 | -2.426342E-09 | |

FIG. 37

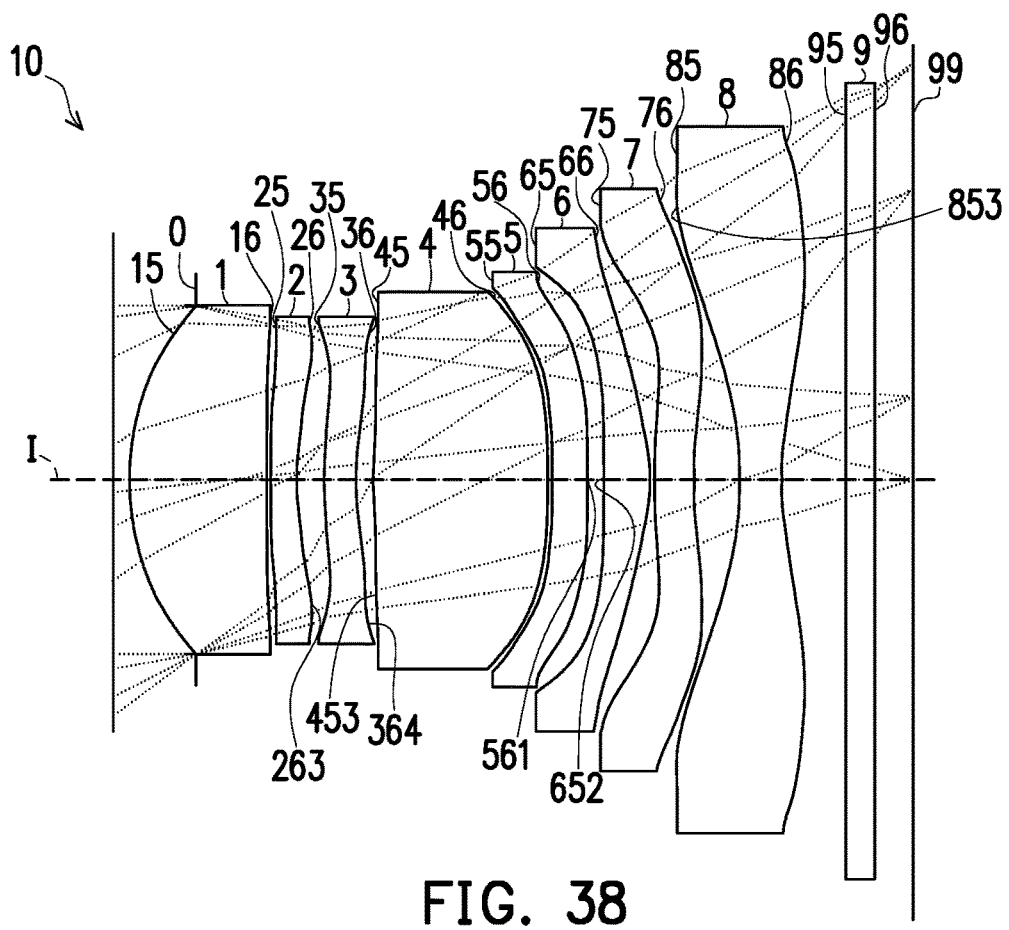
FIG. 38
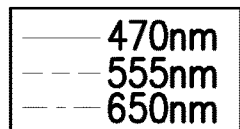
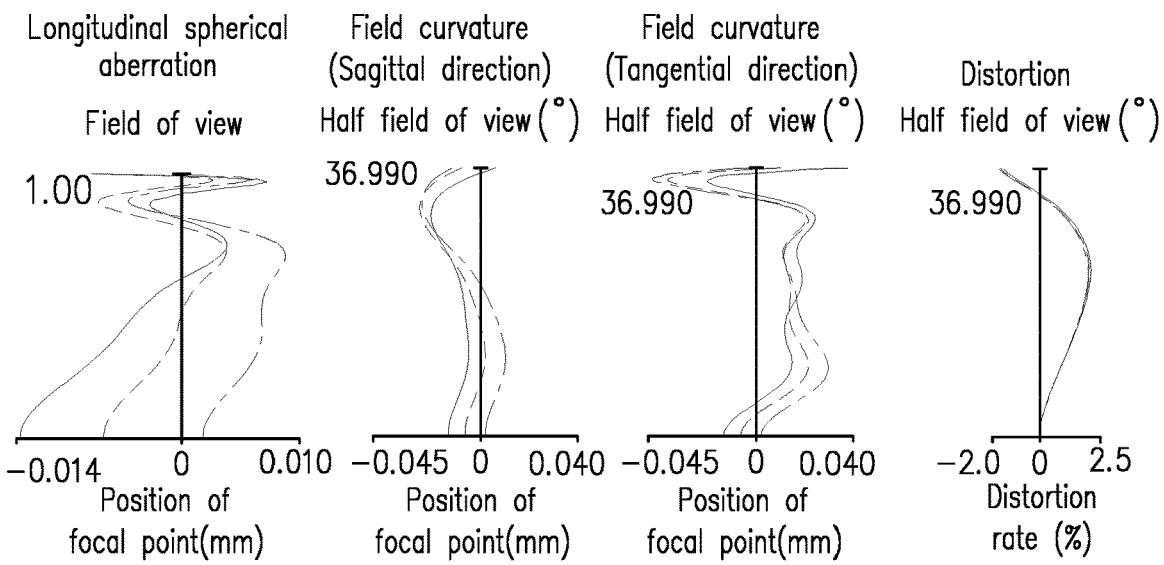
FIG. 39A   FIG. 39B   FIG. 39C   FIG. 39D

| Ninth embodiment | | | | | | |
|---|---|---|---|---|---|---|
| Effective focal length= 4.359 mm, Half field of view= 36.990°, System length= 5.792 mm, F-number= 1.600, Image height= 3.238 mm | | | | | | |
| Element | Surface | Radius (mm) | Thickness (mm) | Refractive index | Abbe number | Focal Length (mm) |
| Object | | Infinity | Infinity | | | |
| Aperture 0 | | Infinity | -0.505 | | | |
| First lens element 1 | Object-side surface 15 | 2.045 | 1.020 | 1.545 | 55.987 | 4.026 |
| | Image-side surface 16 | 24.038 | 0.029 | | | |
| Second lens element 2 | Object-side surface 25 | 7.861 | 0.220 | 1.661 | 20.373 | -8.388 |
| | Image-side surface 26 | 3.232 | 0.178 | | | |
| Third lens element 3 | Object-side surface 35 | 3.725 | 0.240 | 1.661 | 20.373 | -87.633 |
| | Image-side surface 36 | 3.412 | 0.126 | | | |
| Fourth lens element 4 | Object-side surface 45 | 11.743 | 1.376 | 1.545 | 55.987 | 9.706 |
| | Image-side surface 46 | -9.266 | 0.031 | | | |
| Fifth lens element 5 | Object-side surface 55 | -9.178 | 0.270 | 1.661 | 20.373 | -46.007 |
| | Image-side surface 56 | -13.247 | 0.030 | | | |
| Sixth lens element 6 | Object-side surface 65 | -9.339 | 0.327 | 1.545 | 55.987 | 4.799 |
| | Image-side surface 66 | -2.072 | 0.030 | | | |
| Seventh lens element 7 | Object-side surface 75 | 3.235 | 0.300 | 1.545 | 55.987 | 23.912 |
| | Image-side surface 76 | 4.160 | 0.317 | | | |
| Eighth lens element 8 | Object-side surface 85 | -2.742 | 0.320 | 1.545 | 55.987 | -2.635 |
| | Image-side surface 86 | 3.154 | 0.488 | | | |
| Filter 9 | Object-side surface 95 | Infinity | 0.210 | 1.517 | 64.167 | |
| | Image-side surface 96 | Infinity | 0.280 | | | |
| | Image plane 99 | Infinity | | | | |

FIG. 40

| Surface | K | $a_2$ | $a_4$ | $a_6$ | $a_8$ |
|---|---|---|---|---|---|
| 15 | 0.000000E+00 | 0.000000E+00 | -5.208768E-04 | 2.643506E-03 | -1.382085E-03 |
| 16 | 0.000000E+00 | 0.000000E+00 | -3.350508E-03 | -1.636114E-03 | 5.455394E-03 |
| 25 | 0.000000E+00 | 0.000000E+00 | -2.452715E-02 | 6.086413E-03 | -8.929796E-04 |
| 26 | 0.000000E+00 | 0.000000E+00 | -4.172887E-02 | 2.709567E-04 | -1.700883E-03 |
| 35 | 0.000000E+00 | 0.000000E+00 | -9.370401E-02 | -2.438068E-02 | 7.391075E-03 |
| 36 | 0.000000E+00 | 0.000000E+00 | -7.380119E-02 | -1.430376E-02 | -2.868492E-03 |
| 45 | 0.000000E+00 | 0.000000E+00 | -1.329897E-02 | -1.071246E-02 | -5.377871E-03 |
| 46 | 0.000000E+00 | 0.000000E+00 | -1.085737E-01 | -4.316637E-02 | 2.286784E-02 |
| 55 | 0.000000E+00 | 0.000000E+00 | -1.254444E-01 | -1.356026E-02 | 1.555193E-02 |
| 56 | 0.000000E+00 | 0.000000E+00 | -1.497593E-01 | 5.525801E-02 | -1.089576E-02 |
| 65 | 0.000000E+00 | 0.000000E+00 | -3.631712E-02 | 1.902040E-02 | -1.491998E-02 |
| 66 | 0.000000E+00 | 0.000000E+00 | 9.427376E-02 | -1.144840E-02 | -2.641841E-03 |
| 75 | 0.000000E+00 | 0.000000E+00 | -1.456594E-01 | -5.961301E-03 | 7.805376E-03 |
| 76 | 0.000000E+00 | 0.000000E+00 | -8.335959E-02 | 9.358083E-03 | 9.149971E-05 |
| 85 | 0.000000E+00 | 0.000000E+00 | 2.537122E-02 | -8.880870E-04 | 3.438259E-04 |
| 86 | 0.000000E+00 | 0.000000E+00 | -6.620304E-02 | 1.131164E-02 | -1.226734E-03 |
| Surface | $a_{10}$ | $a_{12}$ | $a_{14}$ | $a_{16}$ | |
| 15 | -1.000768E-04 | 3.967222E-04 | 3.607734E-05 | -5.242737E-05 | |
| 16 | -6.606150E-04 | -2.442690E-03 | -3.503625E-04 | 7.944802E-04 | |
| 25 | 1.079820E-03 | -1.382538E-03 | -2.690385E-03 | 1.773765E-03 | |
| 26 | -5.704350E-03 | -4.286040E-03 | -1.265860E-03 | 2.083189E-03 | |
| 35 | 4.462453E-04 | -2.274142E-03 | 4.672790E-04 | -1.796109E-04 | |
| 36 | 1.160028E-02 | 7.535516E-03 | 9.208939E-04 | -2.515356E-03 | |
| 45 | 4.006920E-03 | 3.287380E-03 | 8.661167E-04 | -6.725947E-04 | |
| 46 | 9.774856E-03 | -3.301637E-03 | -2.514251E-03 | 8.684298E-04 | |
| 55 | 1.074939E-03 | -1.100976E-03 | -1.519015E-04 | 9.705354E-05 | |
| 56 | -3.023928E-03 | 5.424914E-04 | 7.036924E-04 | -1.321544E-04 | |
| 65 | 2.867378E-03 | -3.452496E-04 | -4.207265E-04 | 1.688460E-04 | |
| 66 | 6.109000E-04 | 1.366048E-04 | 2.797064E-05 | -1.003305E-05 | |
| 75 | 7.930552E-04 | -2.288718E-04 | -2.594873E-05 | 2.502089E-06 | |
| 76 | 6.005417E-05 | -1.709527E-05 | -1.191176E-06 | 3.048015E-07 | |
| 85 | 3.504348E-06 | -2.423090E-06 | -6.039780E-07 | 1.035615E-07 | |
| 86 | 3.966856E-05 | 1.143828E-06 | -1.546661E-08 | 3.613685E-09 | |

FIG. 41

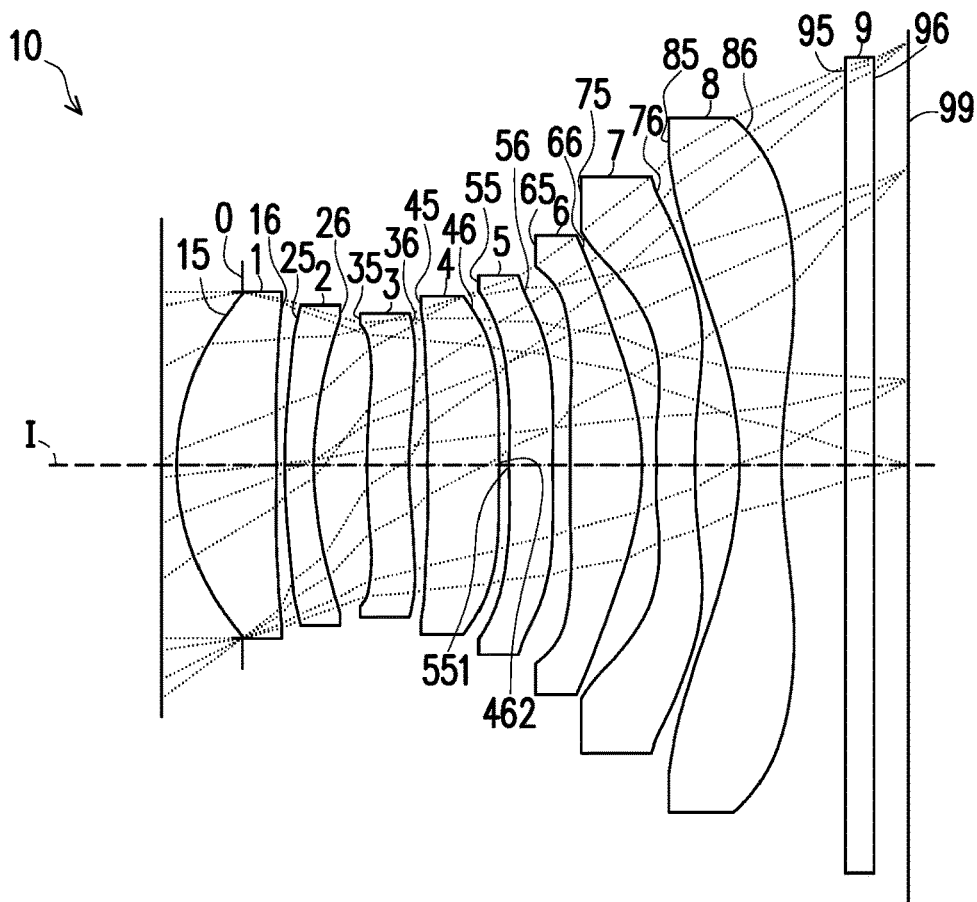
FIG. 42
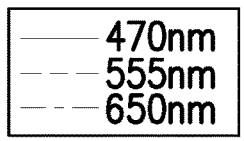
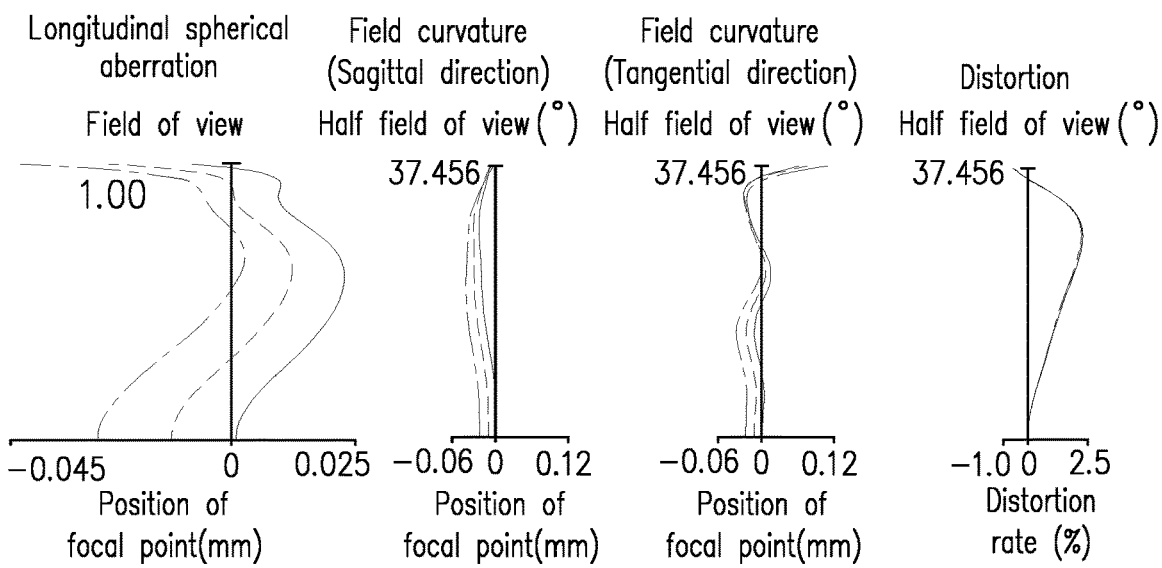
FIG. 43A    FIG. 43B   FIG. 43C   FIG. 43D

| Tenth embodiment |||||||
|---|---|---|---|---|---|---|
| Effective focal length= 4.225 mm, Half field of view= 37.456°, System length=5.475 mm, F-number= 1.600, Image height= 3.238 mm |||||||
| Element | Surface | Radius (mm) | Thickness (mm) | Refractive index | Abbe number | Focal Length (mm) |
| Object | | Infinity | Infinity | | | |
| Aperture 0 | | Infinity | -0.490 | | | |
| First lens element 1 | Object-side surface 15 | 1.975 | 0.738 | 1.545 | 55.987 | 3.974 |
| | Image-side surface 16 | 19.018 | 0.068 | | | |
| Second lens element 2 | Object-side surface 25 | 5.535 | 0.216 | 1.661 | 20.373 | -9.047 |
| | Image-side surface 26 | 2.842 | 0.401 | | | |
| Third lens element 3 | Object-side surface 35 | 4.762 | 0.320 | 1.661 | 20.373 | 13089.462 |
| | Image-side surface 36 | 4.636 | 0.133 | | | |
| Fourth lens element 4 | Object-side surface 45 | 677.202 | 0.535 | 1.545 | 55.987 | -4646.340 |
| | Image-side surface 46 | 534.425 | 0.071 | | | |
| Fifth lens element 5 | Object-side surface 55 | 11.806 | 0.331 | 1.661 | 20.373 | 22343771.362 |
| | Image-side surface 56 | 11.673 | 0.137 | | | |
| Sixth lens element 6 | Object-side surface 65 | 18.360 | 0.540 | 1.545 | 55.987 | 3.328 |
| | Image-side surface 66 | -1.997 | 0.105 | | | |
| Seventh lens element 7 | Object-side surface 75 | 4.655 | 0.291 | 1.545 | 55.987 | -69.875 |
| | Image-side surface 76 | 4.058 | 0.335 | | | |
| Eighth lens element 8 | Object-side surface 85 | -2.757 | 0.314 | 1.545 | 55.987 | -2.892 |
| | Image-side surface 86 | 3.847 | 0.488 | | | |
| Filter 9 | Object-side surface 95 | Infinity | 0.210 | 1.517 | 64.167 | |
| | Image-side surface 96 | Infinity | 0.242 | | | |
| | Image plane 99 | Infinity | | | | |

FIG. 44

| Surface | K | $a_2$ | $a_4$ | $a_6$ | $a_8$ |
|---|---|---|---|---|---|
| 15 | 0.000000E+00 | 0.000000E+00 | 1.837385E-03 | 2.125550E-03 | -1.428612E-03 |
| 16 | 0.000000E+00 | 0.000000E+00 | 5.348499E-03 | -5.552034E-03 | 2.855646E-03 |
| 25 | 0.000000E+00 | 0.000000E+00 | -3.040499E-02 | 9.471248E-03 | 2.350732E-03 |
| 26 | 0.000000E+00 | 0.000000E+00 | -3.825800E-02 | 8.013632E-03 | 5.648475E-03 |
| 35 | 0.000000E+00 | 0.000000E+00 | -7.053985E-02 | -3.208616E-02 | -5.459974E-03 |
| 36 | 0.000000E+00 | 0.000000E+00 | -6.082197E-02 | -1.680241E-02 | -8.982176E-03 |
| 45 | 0.000000E+00 | 0.000000E+00 | -2.887492E-02 | 3.572201E-03 | -2.895859E-03 |
| 46 | 0.000000E+00 | 0.000000E+00 | -7.406810E-02 | -5.267264E-02 | 2.175599E-02 |
| 55 | 0.000000E+00 | 0.000000E+00 | -1.282570E-01 | -5.982614E-03 | 1.597061E-02 |
| 56 | 0.000000E+00 | 0.000000E+00 | -1.599838E-01 | 5.660502E-02 | -1.088230E-02 |
| 65 | 0.000000E+00 | 0.000000E+00 | -3.309676E-02 | 7.928515E-03 | -1.286495E-02 |
| 66 | 0.000000E+00 | 0.000000E+00 | 7.057389E-02 | -6.399440E-03 | -1.958587E-03 |
| 75 | 0.000000E+00 | 0.000000E+00 | -1.333880E-01 | -9.679551E-03 | 7.457908E-03 |
| 76 | 0.000000E+00 | 0.000000E+00 | -8.699666E-02 | 9.689714E-03 | 4.941639E-05 |
| 85 | 0.000000E+00 | 0.000000E+00 | 2.438963E-02 | -1.080411E-03 | 3.251002E-04 |
| 86 | 0.000000E+00 | 0.000000E+00 | -6.326289E-02 | 1.189415E-02 | -1.276238E-03 |
| Surface | $a_{10}$ | $a_{12}$ | $a_{14}$ | $a_{16}$ | |
| 15 | 4.090334E-05 | 4.009432E-04 | -5.641396E-05 | -1.098175E-04 | |
| 16 | -9.393841E-05 | -9.495051E-04 | 1.729244E-04 | 5.899622E-05 | |
| 25 | 2.834085E-03 | -6.194274E-04 | -2.457803E-03 | 1.484392E-03 | |
| 26 | -2.099649E-04 | -1.595233E-03 | -1.196897E-03 | 1.091299E-03 | |
| 35 | -4.131850E-03 | -1.989724E-03 | 1.249957E-03 | 2.683017E-05 | |
| 36 | 2.974213E-03 | 2.416888E-03 | 8.700122E-04 | -5.153482E-04 | |
| 45 | 2.721216E-03 | 1.684240E-03 | -3.602299E-04 | -6.657241E-04 | |
| 46 | 1.026880E-02 | -2.983357E-03 | -2.568038E-03 | 6.162525E-04 | |
| 55 | 7.243100E-04 | -1.316578E-03 | -1.486001E-04 | 2.076123E-04 | |
| 56 | -2.904717E-03 | 6.885254E-04 | 7.839884E-04 | -9.930738E-05 | |
| 65 | 3.475439E-03 | -3.802294E-04 | -4.774210E-04 | 1.517875E-04 | |
| 66 | 6.833561E-04 | 1.329895E-04 | 2.026576E-05 | -1.409732E-05 | |
| 75 | 7.824361E-04 | -2.236330E-04 | -2.361623E-05 | 3.211290E-06 | |
| 76 | 5.539502E-05 | -1.734357E-05 | -1.234015E-06 | 2.855652E-07 | |
| 85 | 1.576709E-06 | -2.614673E-06 | -6.188081E-07 | 1.035579E-07 | |
| 86 | 3.308143E-05 | 7.392640E-07 | -1.359159E-08 | 8.972508E-09 | |

FIG. 45

| Conditional Expression | First embodiment | Second embodiment | Third embodiment | Fourth embodiment | Fifth embodiment |
|---|---|---|---|---|---|
| EFL | 4.446 | 4.260 | 4.346 | 4.335 | 4.364 |
| T1 | 0.791 | 0.454 | 0.652 | 0.642 | 0.726 |
| G12 | 0.069 | 0.086 | 0.155 | 0.030 | 0.048 |
| T2 | 0.220 | 0.471 | 0.220 | 0.198 | 0.220 |
| G23 | 0.208 | 0.553 | 0.415 | 0.951 | 0.458 |
| T3 | 0.240 | 0.311 | 0.240 | 0.240 | 0.240 |
| G34 | 0.325 | 0.032 | 0.199 | 0.036 | 0.047 |
| T4 | 0.557 | 0.381 | 0.591 | 0.652 | 0.685 |
| G45 | 0.231 | 0.206 | 0.137 | 0.125 | 0.127 |
| T5 | 0.270 | 0.243 | 0.270 | 0.270 | 0.270 |
| G56 | 0.088 | 0.185 | 0.211 | 0.030 | 0.030 |
| T6 | 0.468 | 1.086 | 0.264 | 0.800 | 0.501 |
| G67 | 0.126 | 0.148 | 0.093 | 0.028 | 0.030 |
| T7 | 0.300 | 0.442 | 0.300 | 0.300 | 0.300 |
| G78 | 0.303 | 0.413 | 0.511 | 0.384 | 0.376 |
| T8 | 0.320 | 0.258 | 0.320 | 0.221 | 0.691 |
| G8F | 0.488 | 0.488 | 0.488 | 0.488 | 0.488 |
| TF | 0.210 | 0.210 | 0.210 | 0.210 | 0.210 |
| GFP | 0.280 | 0.280 | 0.280 | 0.280 | 0.280 |
| BFL | 0.978 | 0.978 | 0.978 | 0.978 | 0.978 |
| ALT | 3.166 | 3.645 | 2.857 | 3.323 | 3.632 |
| AAG | 1.350 | 1.623 | 1.721 | 1.584 | 1.117 |
| TL | 4.516 | 5.268 | 4.578 | 4.906 | 4.749 |
| TTL | 5.494 | 6.246 | 5.556 | 5.884 | 5.727 |
| (G12+G34+G45)/G23 | 2.998 | 0.586 | 1.184 | 0.201 | 0.486 |
| TTL/(T1+T4+BFL) | 2.361 | 3.445 | 2.501 | 2.590 | 2.398 |
| ALT/(T2+T6+T8) | 3.142 | 2.009 | 3.554 | 2.726 | 2.573 |
| (T2+T8+G67)/G23 | 3.199 | 1.586 | 1.526 | 0.470 | 2.054 |
| (T3+T5+T7+G12)/T2 | 3.996 | 2.294 | 4.384 | 4.245 | 3.901 |
| (T3+T5+T7+G56)/T8 | 2.805 | 4.577 | 3.192 | 3.797 | 1.216 |
| TL/(T1+T4+BFL) | 1.941 | 2.905 | 2.061 | 2.159 | 1.988 |
| (AAG+BFL)/(T2+T6+T8) | 2.310 | 1.433 | 3.358 | 2.102 | 1.484 |
| (T2+T8+G67)/G78 | 2.200 | 2.126 | 1.238 | 1.165 | 2.499 |
| (T3+T5+T7+G34)/T4 | 2.036 | 2.698 | 1.708 | 1.297 | 1.251 |
| (T3+T5+T7+G78)/T1 | 1.406 | 3.099 | 2.026 | 1.860 | 1.635 |
| EFL/(T1+T4+BFL) | 1.911 | 2.349 | 1.957 | 1.908 | 1.827 |
| AAG/(T2+T6+T8) | 1.339 | 0.894 | 2.141 | 1.299 | 0.791 |
| (T2+T8+G67)/T6 | 1.424 | 0.808 | 2.399 | 0.559 | 1.877 |
| (T3+T5+T7+G45)/T6 | 2.224 | 1.107 | 3.591 | 1.169 | 1.871 |

FIG. 46

| Conditional Expression | Sixth embodiment | Seventh embodiment | Eighth embodiment | Ninth embodiment | Tenth embodiment |
|---|---|---|---|---|---|
| EFL | 4.355 | 4.364 | 4.273 | 4.359 | 4.225 |
| T1 | 0.645 | 0.751 | 1.046 | 1.020 | 0.738 |
| G12 | 0.030 | 0.030 | 0.028 | 0.029 | 0.068 |
| T2 | 0.220 | 0.220 | 0.220 | 0.220 | 0.216 |
| G23 | 0.403 | 0.329 | 0.181 | 0.178 | 0.401 |
| T3 | 0.634 | 0.392 | 0.240 | 0.240 | 0.320 |
| G34 | 0.051 | 0.057 | 0.112 | 0.126 | 0.133 |
| T4 | 0.710 | 0.598 | 1.355 | 1.376 | 0.535 |
| G45 | 0.030 | 0.153 | 0.035 | 0.031 | 0.071 |
| T5 | 0.292 | 0.401 | 0.270 | 0.270 | 0.331 |
| G56 | 0.259 | 0.143 | 0.031 | 0.030 | 0.137 |
| T6 | 0.429 | 0.294 | 0.442 | 0.327 | 0.540 |
| G67 | 0.030 | 0.039 | 0.039 | 0.030 | 0.105 |
| T7 | 0.702 | 0.520 | 0.300 | 0.300 | 0.291 |
| G78 | 0.269 | 0.255 | 0.350 | 0.317 | 0.335 |
| T8 | 0.320 | 0.320 | 0.320 | 0.320 | 0.314 |
| G8F | 0.488 | 0.488 | 0.488 | 0.488 | 0.488 |
| TF | 0.210 | 0.210 | 0.210 | 0.210 | 0.210 |
| GFP | 0.280 | 0.280 | 0.356 | 0.280 | 0.242 |
| BFL | 0.978 | 0.978 | 1.054 | 0.978 | 0.940 |
| ALT | 3.952 | 3.496 | 4.192 | 4.073 | 3.285 |
| AAG | 1.072 | 1.005 | 0.776 | 0.741 | 1.250 |
| TL | 5.024 | 4.501 | 4.968 | 4.814 | 4.535 |
| TTL | 6.002 | 5.479 | 6.022 | 5.792 | 5.475 |
| (G12+G34+G45)/G23 | 0.275 | 0.728 | 0.965 | 1.041 | 0.680 |
| TTL/(T1+T4+BFL) | 2.573 | 2.354 | 1.743 | 1.716 | 2.474 |
| ALT/(T2+T6+T8) | 4.077 | 4.193 | 4.270 | 4.699 | 3.070 |
| (T2+T8+G67)/G23 | 1.415 | 1.757 | 3.199 | 3.199 | 1.584 |
| (T3+T5+T7+G12)/T2 | 7.536 | 6.102 | 3.809 | 3.813 | 4.671 |
| (T3+T5+T7+G56)/T8 | 5.897 | 4.548 | 2.629 | 2.625 | 3.440 |
| TL/(T1+T4+BFL) | 2.154 | 1.934 | 1.438 | 1.427 | 2.050 |
| (AAG+BFL)/(T2+T6+T8) | 2.115 | 2.379 | 1.864 | 1.983 | 2.047 |
| (T2+T8+G67)/G78 | 2.117 | 2.270 | 1.652 | 1.797 | 1.897 |
| (T3+T5+T7+G34)/T4 | 2.365 | 2.289 | 0.680 | 0.680 | 2.010 |
| (T3+T5+T7+G78)/T1 | 2.943 | 2.087 | 1.110 | 1.105 | 1.730 |
| EFL/(T1+T4+BFL) | 1.867 | 1.875 | 1.237 | 1.292 | 1.910 |
| AAG/(T2+T6+T8) | 1.106 | 1.206 | 0.791 | 0.854 | 1.168 |
| (T2+T8+G67)/T6 | 1.328 | 1.970 | 1.310 | 1.744 | 1.176 |
| (T3+T5+T7+G45)/T6 | 3.862 | 4.991 | 1.913 | 2.572 | 1.877 |

FIG. 47

OPTICAL IMAGING LENS

CROSS-REFERENCE TO RELATED APPLICATION

This application is a continuation application of and claims the priority benefit of U.S. patent application Ser. No. 16/532,502, filed on Aug. 6, 2019, now allowed, which is a continuation application of and claims the priority benefit of U.S. patent application Ser. No. 15/917,840, filed on Mar. 12, 2018, now patented. The prior U.S. patent application Ser. No. 15/917,840 claims the priority benefit of Chinese application serial No. 201711477961.1, filed on Dec. 29, 2017. The entirety of each of the above-mentioned patent applications is hereby incorporated by reference herein and made a part of this specification.

BACKGROUND OF THE INVENTION

Field of the Invention

The invention is related to an optical element, and particularly to an optical imaging lens.

Description of Related Art

Dimension of consumer electronics is ever-changing, and the key component—optical imaging lens thereof has been developed to be more diversified. Not only that slimness and good imaging quality are required, a larger aperture and field of view are also desired. However, in current optical imaging lens, the distance from the object side-surface of the first lens element to the imaging plane along the optical axis is too large, which makes it difficult to achieve slimness of electronic products. Besides, the design of aperture value and field of view do not satisfy the market's demand. Therefore, it is a great challenge for practitioners in the field to reduce the f-number of optical imaging lens with reduced length of lens while maintaining good imaging quality.

However, the design of an optical lens with good imaging quality and miniaturized size cannot be achieved by simply reducing the proportion of lens with good imaging quality. The design process not only involves property of materials but also actual manufacturing issues such as production and yield rate. In particular, the technical difficulty of miniaturized lens is significantly higher than that of conventional lens. Therefore, it has been an objective for practitioners in the field to find out how to fabricate an optical lens that meets the requirement of consumer electronics while keeping improving the imaging quality thereof.

SUMMARY OF THE INVENTION

The invention provides an optical imaging lens which has good imaging quality and shorter length of lens.

An embodiment of the invention provides an optical imaging lens including a first lens element, a second lens element, a third lens element, a fourth lens element, a fifth lens element, a sixth lens element, a seventh lens element and an eighth lens element arranged in a sequence from an object side to an image side along an optical axis. Each of the first lens element through the eighth lens element includes an object-side surface facing the object side and allowing imaging rays to pass through as well as an image-side surface facing the image side and allowing the imaging rays to pass through. The first lens element has positive refracting power. At least one of the object-side surface and the image-side surface of the second lens element is an aspheric surface. At least one of the object-side surface and image-side surface of the third lens element is an aspheric surface. At least one of the object-side surface and the image-side surface of the fourth lens element is an aspheric surface. Both of the object-side surface and the image-side surface of the fifth lens element are aspheric surfaces. Both of the object-side surface and the image-side surface of the sixth lens element are aspheric surfaces. An optical axis region of the image-side surface of the seventh lens element is concave. An optical axis region of the object-side surface of the eighth lens element is concave. Among the lens elements of the optical imaging lens, only the above-mentioned eight lens elements have refracting power, and the optical imaging lens satisfies the condition expression: $(G12+G34+G45)/G23 \leq 3.000$. G12 is an air gap between the first lens element and the second lens element along the optical axis. G34 is an air gap between the third lens element and the fourth lens element along the optical axis. G45 is an air gap between the fourth lens element and the fifth lens element along the optical axis, and G23 is an air gap between the second lens element and the third lens element along the optical axis.

An embodiment of the invention provides an optical imaging lens, including a first lens element, a second lens element, a third lens element, a fourth lens element, a fifth lens element, a sixth lens element, a seventh lens element and an eighth lens element arranged in sequence from an object side to an image side along an optical axis. Each of the first lens element through the eighth lens element includes an object-side surface facing the object side and allowing imaging rays to pass through as well as an image-side surface facing the imaging side and allowing the imaging rays to pass through. The first lens element has positive refracting power. At least one of the object-side surface and the image-side surface of the second lens element is an aspheric surface. At least one of the object-side surface and the image-side surface of the third lens element is an aspheric surface. At least one of the object-side surface and the image-side surface of the fourth lens element is an aspheric surface. Both of the object-side surface and the image-side surface of the fifth lens element are aspheric surfaces. An optical axis region of the image-side surface of the sixth lens element is convex. An optical axis region of the object-side surface of the seventh lens element is convex. An optical axis region of the object-side surface of the eighth lens element is concave. Among the lens elements of the optical imaging lens, only the above-mentioned eight lens elements have refracting power, and the optical imaging lens satisfies the condition expression: $(G12+G34+G45)/G23 \leq 3.000$. G12 is an air gap between the first lens element and the second lens element along the optical axis. G34 is an air gap between the third lens element and the fourth lens element along the optical axis. G45 is an air gap between the fourth lens element and the fifth lens element along the optical axis, and G23 is an air gap between the second lens element and the third lens element along the optical axis.

An embodiment of the invention provides an optical imaging lens, including a first lens element, a second lens element, a third lens element, a fourth lens element, a fifth lens element, a sixth lens element, a seventh lens element and an eighth lens element arranged in a sequence from an object side to an image side along an optical axis. Each of the first lens element through the eighth lens element includes an object-side surface facing the object side and allowing imaging rays to pass through as well as an image-side surface facing the image side and allowing the imaging rays to pass through. The first lens element has positive refracting power. At least one of the object-side surface and the image-side surface of the second lens element is an aspheric surface. At least one of the object-side surface and the image-side surface of the third lens element is an aspheric surface. At least one of the object-side surface and the image-side surface of the fourth lens element is an aspheric surface. Both of the object-side surface and the image-side surface of the fifth lens element are aspheric surfaces. The sixth lens element has positive refracting power. An optical axis region of the object-side surface of the seventh lens element is convex. An optical axis region of the object-side surface of the eighth lens element is concave. Among the lens elements of the optical imaging lens, only the above-mentioned eight lens elements have refracting power, and the optical imaging lens satisfies the condition expression: (G12+G34+G45)/G23≤3.000. G12 is an air gap between the first lens element and the second lens element along the optical axis. G34 is an air gap between the third lens element and the fourth lens element along the optical axis. G45 is an air gap between the fourth lens element and the fifth lens element along the optical axis, and G23 is an air gap between the second lens element and the third lens element along the optical axis.

Based on the above, according to the embodiment of the invention, the advantageous effect of the optical imaging lens is that, by satisfying the combination of the refracting power of the above-mentioned lens elements, the arrangement of the concave and convex surface of the above-mentioned lens elements, the aspheric surface design of the object-side surface and the image-side surface of the lens elements while satisfying the condition expression: (G12+G34+G45)/G23≤3.000, the optical imaging lens described in the embodiment of the invention can effectively reduce the length of the lens while achieving good imaging quality.

In order to make the aforementioned features and advantages of the disclosure more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6 is a schematic view illustrating an optical imaging lens according to a first embodiment of the invention.

FIG. 7A to FIG. 7D are diagrams illustrating longitudinal spherical aberration and other aberrations of the optical imaging lens according to the first embodiment of the invention.

FIG. 8 shows detailed optical data pertaining to the optical imaging lens according to the first embodiment of the invention.

FIG. 9 shows aspheric parameters pertaining to the optical imaging lens according to the first embodiment of the invention.

FIG. 10 is a schematic view illustrating an optical imaging lens according to a second embodiment of the invention.

FIG. 11A to FIG. 11D are diagrams illustrating longitudinal spherical aberration and other aberrations of the optical imaging lens according to the second embodiment of the invention.

FIG. 12 shows detailed optical data pertaining to the optical imaging lens according to the second embodiment of the invention.

FIG. 13 shows aspheric parameters pertaining to the optical imaging lens according to the second embodiment of the invention.

FIG. 16 shows detailed optical data pertaining to the optical imaging lens according to the third embodiment of the invention.

FIG. 17 shows aspheric parameters pertaining to the optical imaging lens according to the third embodiment of the invention.

FIG. 18 is a schematic view illustrating an optical imaging lens according to a fourth embodiment of the invention.

FIG. 19A to FIG. 19D are diagrams illustrating longitudinal spherical aberration and other aberrations of the optical imaging lens according to the fourth embodiment of the invention.

FIG. 20 shows detailed optical data pertaining to the optical imaging lens according to the fourth embodiment of the invention.

FIG. 21 shows aspheric parameters pertaining to the optical imaging lens according to the fourth embodiment of the invention.

FIG. 22 is a schematic view illustrating an optical imaging lens according to a fifth embodiment of the invention.

FIG. 23A to FIG. 23D are diagrams illustrating longitudinal spherical aberration and other aberrations of the optical imaging lens according to the fifth embodiment of the invention.

FIG. 24 shows detailed optical data pertaining to the optical imaging lens according to the fifth embodiment of the invention.

FIG. 25 shows aspheric parameters pertaining to the optical imaging lens according to the fifth embodiment of the invention.

FIG. 26 is a schematic view illustrating an optical imaging lens according to a sixth embodiment of the invention.

FIG. 27A to FIG. 27D are diagrams illustrating longitudinal spherical aberration and other aberrations of the optical imaging lens according to the sixth embodiment of the invention.

FIG. 28 shows detailed optical data pertaining to the optical imaging lens according to the sixth embodiment of the invention.

FIG. 29 shows aspheric parameters pertaining to the optical imaging lens according to the sixth embodiment of the invention.

FIG. 32 shows detailed optical data pertaining to the optical imaging lens according to the seventh embodiment of the invention.

FIG. 33 shows aspheric parameters pertaining to the optical imaging lens according to the seventh embodiment of the invention.

FIG. 36 shows detailed optical data pertaining to the optical imaging lens according to the eighth embodiment of the invention.

FIG. 37 shows aspheric parameters pertaining to the optical imaging lens according to the eighth embodiment of the invention.

FIG. 38 is a schematic view illustrating an optical imaging lens according to a ninth embodiment of the invention.

FIG. 39A to FIG. 39D are diagrams illustrating longitudinal spherical aberration and other aberrations of the optical imaging lens according to the ninth embodiment of the invention.

FIG. 40 shows detailed optical data pertaining to the optical imaging lens according to the ninth embodiment of the invention.

FIG. 41 shows aspheric parameters pertaining to the optical imaging lens according to the ninth embodiment of the invention.

FIG. 42 is a schematic view illustrating an optical imaging lens according to a tenth embodiment of the invention.

FIG. 43A to FIG. 43D are diagrams illustrating longitudinal spherical aberration and other aberrations of the optical imaging lens according to the tenth embodiment of the invention.

FIG. 44 shows detailed optical data pertaining to the optical imaging lens according to the tenth embodiment of the invention.

FIG. 45 shows aspheric parameters pertaining to the optical imaging lens according to the tenth embodiment of the invention.

FIG. 46 shows important parameters and relation values thereof pertaining to the optical imaging lenses according to the first through the fifth embodiments of the invention.

FIG. 47 shows important parameters and relation values thereof pertaining to the optical imaging lenses according to the sixth through the tenth embodiments of the invention.

DESCRIPTION OF THE EMBODIMENTS

Figure 1:
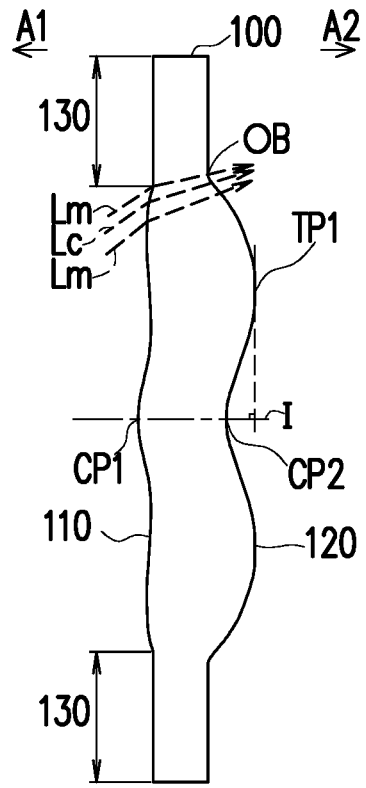
FIG. 1 is a schematic view illustrating a surface structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
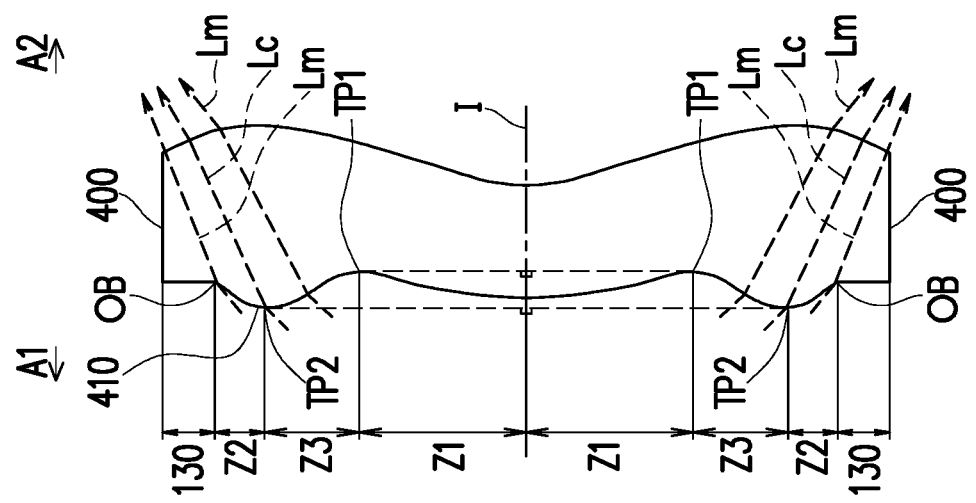
FIG. 4 is a schematic view illustrating a surface structure of a lens element according to a second example.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
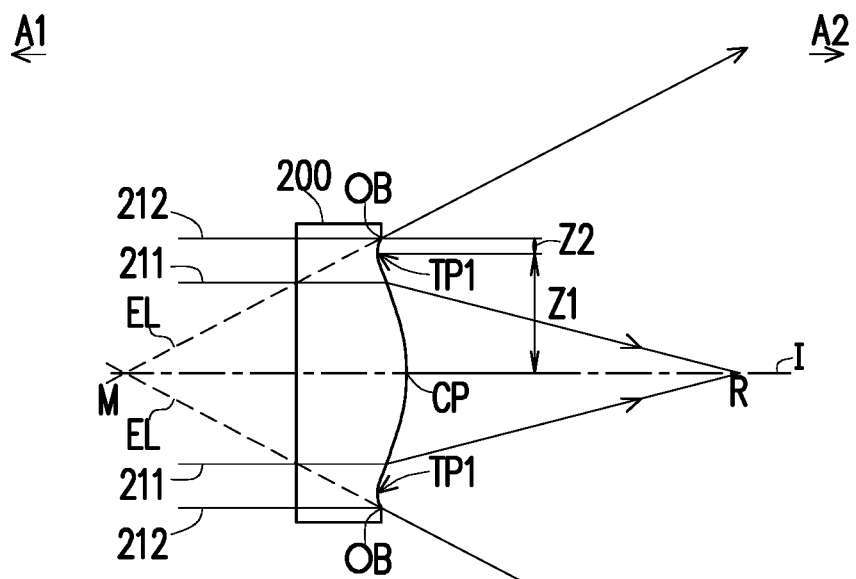
FIG. 2 is a schematic view illustrating a concave and convex surface structure of a lens element and a ray focal point.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
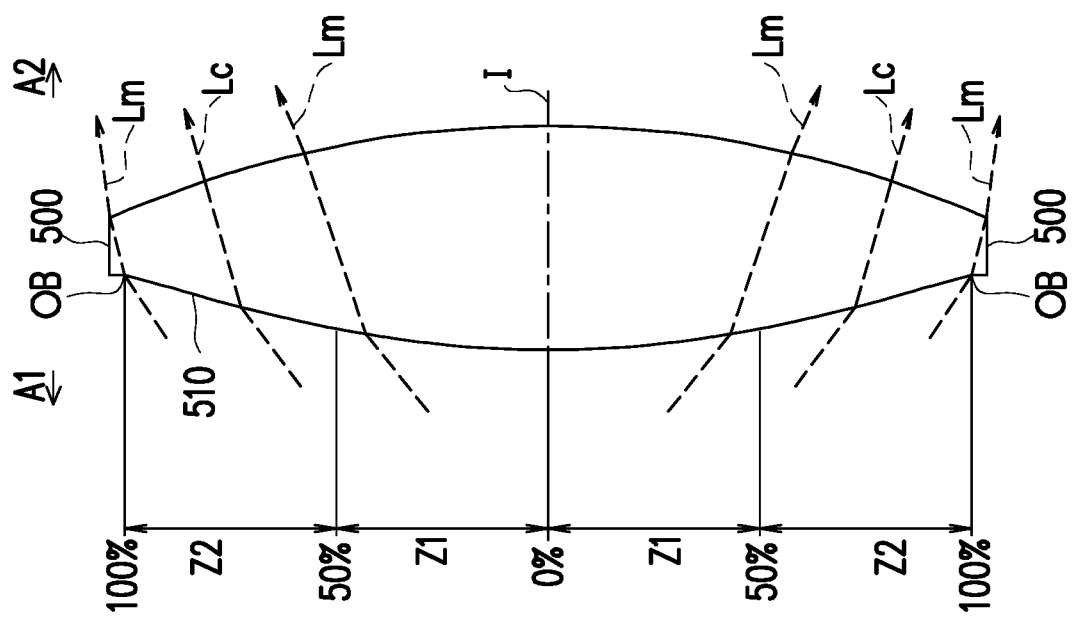
FIG. 5 is a schematic view illustrating a surface structure of a lens element according to a third example.
Figure 3:
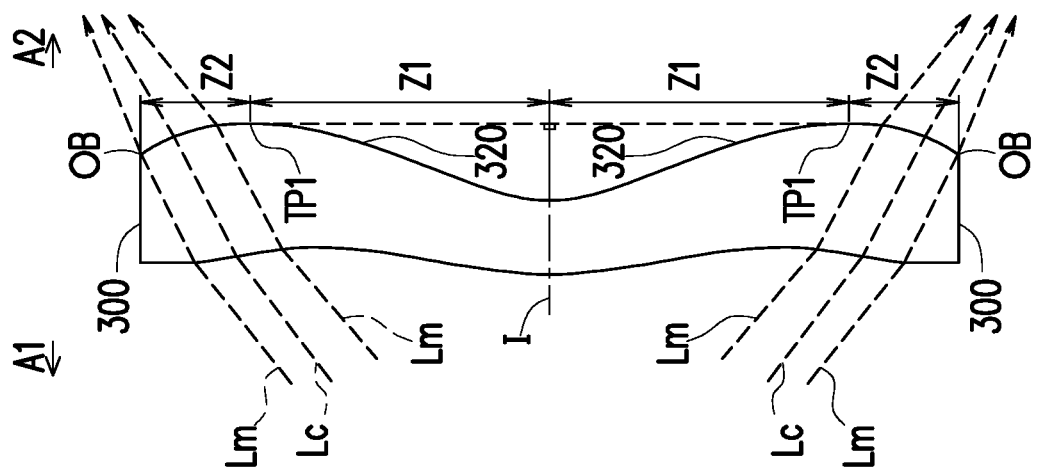
FIG. 3 is a schematic view illustrating a surface structure of a lens element according to a first example.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1, appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

FIG. 6 is a schematic view illustrating an optical imaging lens according to a first embodiment of the invention. FIG. 7A to FIG. 7D are diagrams illustrating longitudinal spherical aberration and other aberrations of the optical imaging lens according to the first embodiment of the invention. Referring to FIG. 6, according to a first embodiment of the invention, an optical imaging lens 10 includes an aperture 0, a first lens element 1, a second lens element 2, a third lens element 3, a fourth lens element 4, a fifth lens element 5, a sixth lens element 6, a seventh lens element 7, an eighth lens element 8 and a filter 9 arranged in a sequence from an object side to an image side along an optical axis I of the optical imaging lens 10. When a light emitted from an object to be captured enters the optical imaging lens 10 and passes through the aperture 0, the first lens element 1, the second lens element 2, the third lens element 3, the fourth lens element 4, the fifth lens element 5, the sixth lens element 6, the seventh lens element 7, the eighth lens element 8 and the filter 9 in sequence, an image is formed on an image plane 99. The filter 9 is, for example, an infrared cut-off filter disposed between the eighth lens element 8 and the image plane 99. It should be noted that the object side is a side facing the object to be captured, and the image side is a side facing the image plane 99.

In the embodiment, each of the first lens element 1, the second lens element 2, the third lens element 3, the fourth lens element 4, the fifth lens element 5, the sixth lens element 6, the seventh lens element 7, the eighth lens element 8 and the filter 9 of the optical imaging lens 10 respectively has an object-side surface 15, 25, 35, 45, 55, 65, 75, 85 and 95 facing the object side and allowing imaging rays to pass through as well as an image-side surface 16, 26, 36, 46, 56, 66, 76, 86 and 96 facing the image side and allowing the imaging rays to pass through. In the embodiment, the aperture 0 is disposed in front of the first lens element 3.

The first lens element 1 has positive refracting power. An optical axis region 151 of the object-side surface 15 of the first lens element 1 is convex, and a periphery region 153 thereof is convex. An optical axis region 162 of the image-side surface 16 of the first lens element 1 is concave, and a periphery region 164 thereof is concave. In the embodiment, the object-side surface 15 and the image-side surface 16 of the first lens element 1 are aspheric surfaces.

The second lens element 2 has negative refracting power. An optical axis region 251 of the object-side surface 25 of the second lens element 2 is convex, and a periphery region 253 thereof is convex. An optical axis region 262 of the image-side surface 26 of the second lens element 2 is concave, and a periphery region 264 thereof is concave. In the embodiment, the object-side surface 25 and the image-side surface 26 of the second lens element 2 are aspheric surfaces.

The third lens element 3 has positive refracting power. An optical axis region 351 of the object-side surface 35 of the third lens element 3 is a convex, and a periphery region 354 thereof is concave. An optical axis region 362 of the image-side surface 36 of the third lens element 3 is concave, and a periphery region 363 thereof is convex. In the embodiment, the object-side surface 35 and the image-side surface 36 of the third lens element 3 are aspheric surfaces.

The fourth lens element 4 has positive refracting power. An optical axis region 451 of the object-side surface 45 of the fourth lens element 4 is convex, and a periphery region 454 thereof is concave. An optical axis region 461 of the image-side surface 46 of the fourth lens element 4 is convex, and a periphery region 463 thereof is convex. In the embodiment, the object-side surface 45 and the image-side surface 46 of the fourth lens element 4 are aspheric surfaces.

The fifth lens element 5 has negative refracting power. An optical axis region 552 of the object-side surface 55 of the fifth lens element 5 is a concave, and a periphery region 554 thereof is concave. An optical axis region 562 of the image-side surface 56 of the fifth lens element 5 is concave, and a periphery region 563 thereof is convex. In the embodiment, the object-side surface 55 and the image-side surface 56 of the fifth lens element 5 are aspheric surfaces.

The sixth lens element 6 has positive refracting power. An optical axis region 651 of the object-side surface 65 of the sixth lens element 6 is convex, and a periphery region 654 thereof is concave. An optical axis region 661 of the image-side surface 66 of the sixth lens element 6 is convex, and a periphery region 663 thereof is convex. In the embodiment, the object-side surface 65 and the image-side surface 66 of the sixth lens element 6 are aspheric surfaces.

The seventh lens element 7 has positive refracting power. An optical axis region 751 of the object-side surface 75 of the seventh lens element 7 is convex, and a periphery region 754 thereof is concave. An optical axis region 762 of the image-side surface 76 of the seventh lens element 7 is concave, and a periphery region 763 of the image-side surface 76 thereof is convex. In the embodiment, both of the object-side surface 75 and the image-side surface 76 of the seventh lens element 7 are aspheric surfaces.

The eighth lens element 8 has negative refracting power. An optical axis region 852 of the object-side surface 85 of the eighth lens element 8 is concave, and a periphery region 854 thereof is concave. An optical axis region 862 of the image-side surface 86 of the eighth lens element 8 is concave, and a periphery region 863 thereof is convex. In the embodiment, the object-side surface 85 and the image-side surface 86 of the eighth lens element 8 are aspheric surfaces.

In the embodiment, among the lens elements of the optical imaging lens 10, only the above-mentioned eight lens elements have refracting power.

Other detailed optical data of the first embodiment is as shown in FIG. 8. In the first embodiment, the effective focal length (EFL) of the optical imaging lens 10 is 4.446 mm, the half field of view is 36.083°, the system length is 5.494 mm, the F-number (Fno) is 1.600, the image height is 3.238 mm, wherein the system length refers to a distance from the object-side surface 15 of the first lens element 1 to the image plane 99 along the optical axis I. It should be noted that the "Radius" in the FIGS. 8,12,16,20,24,28,32,36,40 and 44 is a radius of curvature (i.e. the "R" value), which is the paraxial radius of shape of a lens surface in the optical axis region.

Additionally, in the embodiment, a total of sixteen surfaces, namely the object-side surfaces 15, 25, 35, 45, 55, 65, 75 and 85 as well as the image-side surfaces 16, 26, 36, 46, 56, 66, 76 and 86 of the first lens element 1, the second lens element 2, the third lens element 3, the fourth lens element 4, the fifth lens element 5, the sixth lens element 6, the seventh lens element 7 and eighth lens element 8 are general even asphere surfaces. The aspheric surfaces are defined by the following equation:

$$Z(Y) = \frac{Y^2}{R} \bigg/ \left(1 + \sqrt{1 - (1+K)\frac{Y^2}{R^2}}\right) + \sum_{i=1}^{n} a_i \times Y^i \qquad (1)$$

Y: a distance from a point on an aspheric curve to the optical axis;

Z: a depth of the aspheric surface (i.e. a perpendicular distance between the point on the aspheric surface that is spaced by the distance Y from the optical axis and a tangent plane tangent to a vertex of the aspheric surface on the optical axis);

R: radius of curvature of the surface of the lens element;

K: conic constant $a_i$: $i^{th}$ aspheric coefficient

Each aspheric coefficient from the object-side surface 15 of the first lens element 1 to the image-side surface 86 of the eighth lens element 8 in the equation (1) is indicated in FIG. 9. In FIG. 9, the referential number 15 is one column that represents the aspheric coefficient of the object-side surface 15 of the first lens element 1, and the reference numbers in other columns can be deduced from the above.

Additionally, the relationship among the important parameters pertaining to the optical imaging lens 10 of the first embodiment is indicated in FIG. 46.

wherein,

T1 represents the thickness of the first lens element 1 along the optical axis I;

T2 represents the thickness of the second lens element 2 along the optical axis I;

T3 represents the thickness of the third lens element 3 along the optical axis I;

T4 represents the thickness of the fourth lens element 4 along the optical axis I;

T5 represents the thickness of the fifth lens element 5 along the optical axis I;

T6 represents the thickness of the sixth lens element 6 along the optical axis I;

T7 represents the thickness of the seventh lens element 7 along the optical axis I;

T8 represents the thickness of the eighth lens element 8 along the optical axis I;

G12 represents an air gap between the first lens element 1 and the second lens element 2 along the optical axis I;

G23 represents an air gap between the second lens element 2 and the third lens element 3 along the optical axis I;

G34 represents an air gap between the third lens element 3 and the fourth lens element 4 along the optical axis I;

G45 represents an air gap between the fourth lens element 4 and the fifth lens element 5 along the optical axis I;

G56 represents an air gap between the fifth lens element 5 and the sixth lens element 6 along the optical axis I;

G67 represents an air gap between the sixth lens element 6 and the seventh lens element 7 along the optical axis I;

G78 represents an air gap between the seventh lens element 7 and the eighth lens element 8 along the optical axis I;

AAG represents a sum of seven air gaps among the first lens element 1 through the eighth lens element 8 along the optical axis I, i.e., the sum of seven gaps G12, G23, G34, G45, G56, G67 and G78;

ALT represents a sum of thickness of eight lens elements, namely the first lens element 1 through the eighth lens element 8 along the optical axis I, i.e., the sum of thickness T1, T2, T3, T4, T5, T6, T7 and T8;

TL represents a distance from the object-side surface 15 of the first lens element 1 to the image-side surface 86 of the eighth lens element 8 along the optical axis I;

TTL represents a distance from the object-side surface 15 of the first lens element 1 to the image plane 99 along the optical axis I;

BFL represents a distance from the image-side surface 86 of the eighth lens element 8 to the image plane 99 along the optical axis I;

ImgH is the image height of the optical imaging lens 10;

EFL represents the effective focal length of the optical imaging lens 10.

Further, it is defined that:

G8F is an air gap between the eighth lens element 8 and the filter 9 along the optical axis I;

TF is the thickness of the filter 9 along the optical axis I;

GFP is an air gap between the filter 9 and the image plane 99 along the optical axis I;

f1 is a focal length of the first lens element 1;
f2 is a focal length of the second lens element 2;
f3 is a focal length of the third lens element 3;
f4 is a focal length of the fourth lens element 4;
f5 is a focal length of the fifth lens element 5;
f6 is a focal length of the sixth lens element 6;
f7 is a focal length of the seventh lens element 7;
f8 is a focal length of the eighth lens element 8;
n1 is a refractive index of the first lens element 1;
n2 is a refractive index of the second lens element 2;
n3 is a refractive index of the third lens element 3;
n4 is a refractive index of the fourth lens element 4;
n5 is a refractive index of the fifth lens element 5;
n6 is a refractive index of the sixth lens element 6;
n7 is a refractive index of the seventh lens element 7;
n8 is a refractive index of the eighth lens element 8;
V1 is an Abbe number of the first lens element 1;
V2 is an Abbe number of the second lens element 2;
V3 is an Abbe number of the third lens element 3;
V4 is an Abbe number of the fourth lens element 4;
V5 is an Abbe number of the fifth lens element 5;
V6 is an Abbe number of the sixth lens element 6;
V7 is an Abbe number of the seventh lens element 7; and
V8 is an Abbe number of the eighth lens element 8.

With reference to FIG. 7A to FIG. 7D, FIG. 7A is a diagram describing the longitudinal spherical aberration in the first embodiment in the condition that the pupil radius is 1.3892 mm; FIG. 7B and FIG. 7C are diagrams respectively describing the field curvature aberration in the sagittal direction and the field curvature aberration in the tangential direction on the image plane 99 of the first embodiment in the condition that the wavelength is 470 nm, 555 nm and 650 nm. FIG. 7D is a diagram describing distortion aberration of the image plane 99 of the first embodiment in the condition that the wavelength is 470 nm, 555 nm and 650 nm. In FIG. 7A showing the longitudinal spherical aberration of the first embodiment, the curve of each wavelength is close to one another and near the middle position, which shows that the off-axis ray of each wavelength at different heights are focused near the imaging point. The skew margin of the curve of each wavelength shows that the imaging point deviation of the off-axis ray at different heights is controlled within a range of ±0.011 mm. Therefore, it is evident that the first embodiment can significantly improve spherical aberration of the same wavelength. Additionally, the distances between the three representative wavelengths are close to one another, which represents that the imaging positions of the rays with different wavelengths are concentrated, therefore, the chromatic aberration can be significantly improved.

In FIGS. 7B and 7C which illustrate two diagrams of field curvature aberration, the focal length variation of the three representative wavelengths in the entire field of view falls within a range of ±0.045 mm, which represents that the optical system in the first embodiment can effectively eliminate aberration. In FIG. 7D, the diagram of distortion aberration shows that the distortion aberration in the first embodiment can be maintained within a range of ±1.6%, which shows that the distortion aberration in the first embodiment can meet the imaging quality requirement of the optical system. Based on the above, it is shown that the first embodiment can provide good image quality compared with existing optical imaging lens under the condition where the system length is shortened to about 5.494 mm.

FIG. 10 is a schematic view illustrating an optical imaging lens according to a second embodiment of the invention. FIGS. 11A to 11D are diagrams illustrating longitudinal spherical aberration and other aberrations of the optical imaging lens according to the second embodiment of the invention. Referring to FIG. 10, the second embodiment of the optical imaging lens 10 of the invention is similar to the first embodiment, and the difference lies in optical data, aspheric coefficients and the parameters of the lens elements 1, 2, 3, 4, 5, 6, 7 and 8, and: an optical axis region 161 of the image-side surface 16 of the first lens element 1 is convex. The third lens element 3 has negative refracting power. The optical axis region 462 of the image-side surface 46 of the fourth lens element 4 is concave. The optical axis region 551 of the object-side surface 55 of the fifth lens element 5 is convex. The periphery region 564 of the image-side surface 56 of the fifth lens element 5 is concave. The periphery region 853 of the object-side surface 85 of the eighth lens element 8 is convex. It should be noted that, in order to show the view clearly, some numerals which are the same as those used for the optical axis region and the periphery region in the first embodiment are omitted in FIG. 10.

Detailed optical data pertaining to the optical imaging lens 10 of the second embodiment is as shown in FIG. 12. In the optical imaging lens 10 of the second embodiment, the effective focal length is 4.260 mm, the half field of view (HFOV) is 37.058°, the Fno is 1.600, the system length is 6.246 mm, and the image height is 3.238 mm.

FIG. 13 shows each aspheric coefficient pertaining to the object-side surface 15 of the first lens element 1 through the image-side surface 86 of the eighth lens element 8 in the equation (1) in the second embodiment.

Additionally, the relationship among the important parameters pertaining to the optical imaging lens 10 of the second embodiment is indicated in FIG. 46.

In FIG. 11A which illustrates longitudinal spherical aberration of the second embodiment in the condition that the pupil radius is 1.3311 mm, the imaging point deviation of the off-axis ray at different heights is controlled within a range of ±0.038 mm. In FIGS. 11B and 11C which illustrate two diagrams of field curvature aberration, the focal length variation of the three representative wavelengths in the entire field of view falls within a range of ±0.35 mm. In FIG. 11D, the diagram of distortion aberration shows that the distortion aberration in the second embodiment can be maintained within a range of ±1.2%. In view of the above, the second embodiment can provide a good imaging quality as compared to the first embodiment in the condition that the system length is reduced to about 6.246 mm.

Based on the above, it can be derived that the half field of view of the second embodiment is larger than the half field of view of the first embodiment, and the distortion aberration of the second embodiment is smaller than the distortion aberration of the first embodiment.

Figure 14:
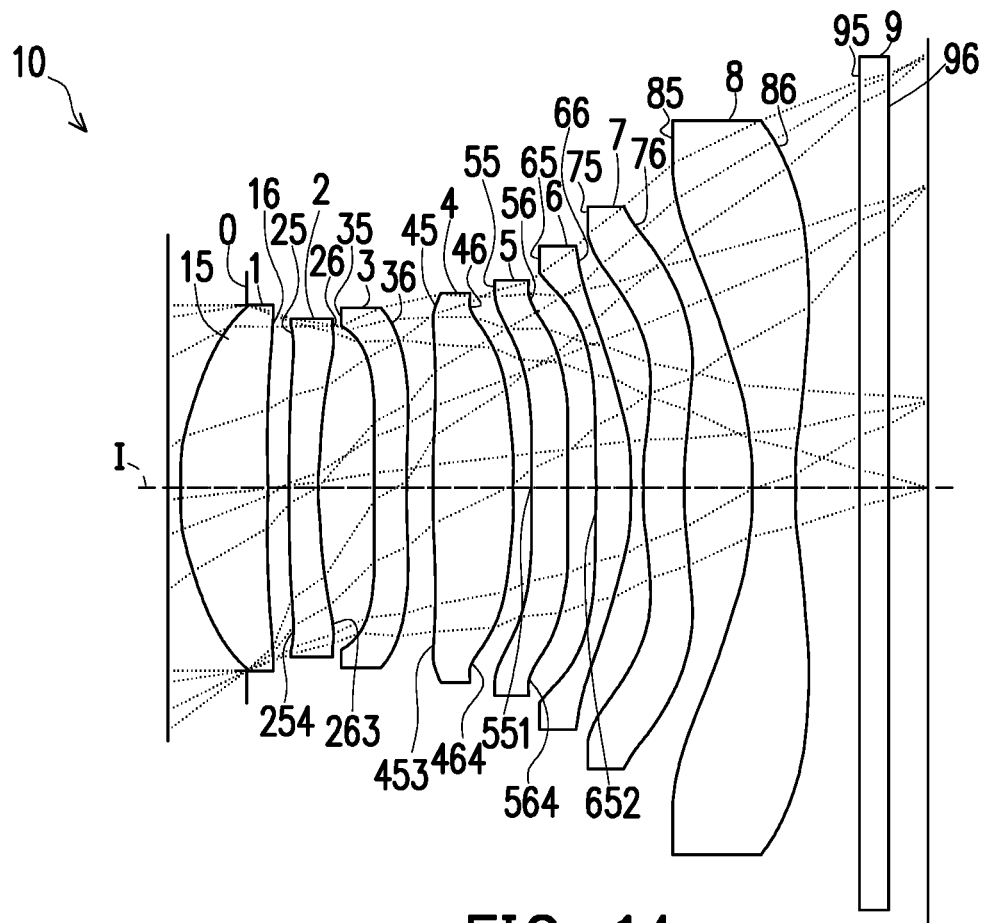
FIG. 14 is a schematic view illustrating an optical imaging lens according to a third embodiment of the invention.

FIG. 14 is a schematic view illustrating an optical imaging lens according to a third embodiment of the invention. FIGS. 15A to 15D are diagrams illustrating longitudinal spherical aberration and other aberrations of the optical imaging lens according to the third embodiment of the invention. Referring to FIG. 14, the third embodiment of the optical imaging lens 10 of the invention is similar to the first embodiment, and the difference lies in optical data, aspheric coefficients and the parameters of the lens elements 1, 2, 3, 4, 5, 6, 7 and 8; and: the periphery region 254 of the object-side surface 25 of the second lens element 2 is concave. The periphery region 263 of the image-side surface 26 of the second lens element 2 is convex. The third lens element 3 has negative refracting power. The periphery region 453 of the object-side surface 45 of the fourth lens element 4 is convex. The periphery region 464 of the image-side surface 46 of the fourth lens element 4 is concave. The optical axis region 551 of the object-side surface 55 of the fifth lens element 5 is convex. The periphery region 564 of the image-side surface 56 of the fifth lens element 5 is concave. The optical axis region 652 of the object-side surface 65 of the sixth lens element 6 is concave. It should be noted that, in order to show the view clearly, some numerals which are the same as those used for the optical axis region and the periphery region in the first embodiment are omitted in FIG. 14.

Detailed optical data pertaining to the optical imaging lens 10 of the third embodiment is as shown in FIG. 16. In the optical imaging lens 10 of the third embodiment, the total effective focal length is 4.346 mm, the half field of view (HFOV) is 36.925°, the f-number (Fno) is 1.600, the system length is 5.556 mm, and the image height is 3.238 mm.

FIG. 17 shows each aspheric coefficient pertaining to the object-side surface 15 of the first lens element 1 through the image-side surface 86 of the eighth lens element 8 in the equation (1) in the third embodiment.

Additionally, the relationship among the important parameters pertaining to the optical imaging lens 10 of the third embodiment is indicated in FIG. 46.

Figure 15A:
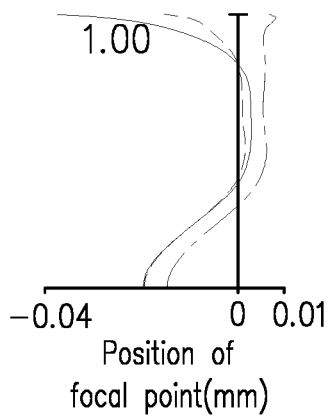
FIG. 15A to FIG. 15D are diagrams illustrating longitudinal spherical aberration and other aberrations of the optical imaging lens according to the third embodiment of the invention.
Figure 15B:
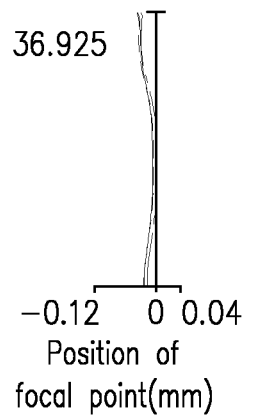
Figure 15C:
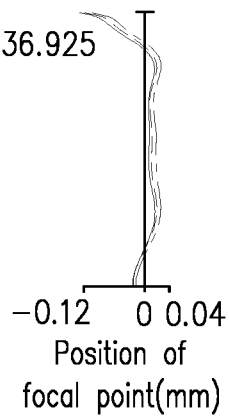
Figure 15D:
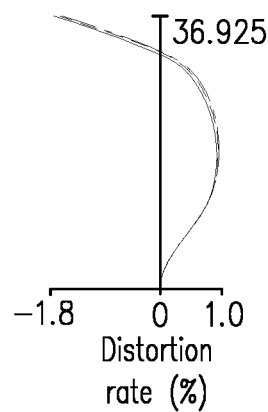

In FIG. 15A which illustrates longitudinal spherical aberration of the third embodiment in the condition that the pupil radius is 1.3581 mm, the imaging point deviation of the off-axis ray at different heights is controlled within a range of ±0.038 mm. In FIGS. 15B and 15C which illustrate two diagrams of field curvature aberration, the focal length variation of the three representative wavelengths in the entire field of view falls within a range of ±0.12 mm. In FIG. 15D, the diagram of distortion aberration shows that the distortion aberration in the third embodiment can be maintained within a range of ±1.8%. In view of the above, the third embodiment can provide a good imaging quality as compared to the first embodiment in the condition that the system length is reduced to about 5.556 mm.

In view of the above, it can be derived that the half field of view of the third embodiment is larger than the half field of view of the first embodiment.

FIG. 18 is a schematic view illustrating an optical imaging lens according to a fourth embodiment of the invention, FIGS. 19A to 19D are diagrams illustrating longitudinal spherical aberration and other aberrations of the optical imaging lens according to the fourth embodiment of the invention. Referring to FIG. 18, the fourth embodiment of the optical imaging lens 10 of the invention is similar to the first embodiment, and the difference lies in optical data, aspheric coefficients and the parameters of the lens elements 1, 2, 3, 4, 5, 6, 7 and 8, and: the optical axis region 161 of the image-side surface 16 of the first lens element 1 is convex. The periphery region 254 of the object-side surface 25 of the second lens element 2 is concave. The third lens element 3 has negative refracting power. The fourth lens element 4 has negative refracting power. The optical axis region 462 of the image-side surface 46 of the fourth lens element 4 is concave. The optical axis region 551 of the object-side surface 55 of the fifth lens element 5 is convex. It should be noted that, in order to show the view clearly, some numerals which are the same as those used for the optical axis region and the periphery region in the first embodiment are omitted in FIG. 18.

Detailed optical data pertaining to the optical imaging lens 10 of the fourth embodiment is as shown in FIG. 20. In the optical imaging lens 10 of the fourth embodiment, the total effective focal length is 4.335 mm, the half field of view (HFOV) is 37.001°, the f-number (Fno) is 1.600, the system length is 5.884 mm, and the image height is 3.238 mm.

FIG. 21 shows each aspheric coefficient pertaining to the object-side surface 15 of the first lens element 1 through the image-side surface 86 of the eighth lens element 8 in the equation (1) in the fourth embodiment.

Additionally, the relationship among the important parameters pertaining to the optical imaging lens 10 of the fourth embodiment is indicated in FIG. 46.

In FIG. 19A which illustrates longitudinal spherical aberration of the fourth embodiment in the condition that the pupil radius is 1.3548 mm, the imaging point deviation of the off-axis ray at different heights is controlled within a range of ±0.014 mm. In FIGS. 19B and 19C which illustrate two diagrams of field curvature aberration, the focal length variation of the three representative wavelengths in the entire field of view falls within a range of ±0.07 mm. In FIG. 19D, the diagram of distortion aberration shows that the distortion aberration in the fourth embodiment can be maintained within a range of ±2.0%. In view of the above, the fourth embodiment can provide a good imaging quality as compared to the first embodiment in the condition that the system length is reduced to about 5.884 mm.

Based on the above, it can be derived that the half field of view of the fourth embodiment is larger than the half field of view of the first embodiment.

FIG. 22 is a schematic view illustrating an optical imaging lens according to a fifth embodiment of the invention, FIGS. 23A to 23D are diagrams illustrating longitudinal spherical aberration and other aberrations of the optical imaging lens according to the fifth embodiment of the invention. Referring to FIG. 22, the fifth embodiment of the optical imaging lens 10 of the invention is similar to the first embodiment, and the difference lies in optical data, aspheric coefficients and the parameters of the lens elements 1, 2, 3, 4, 5, 6, 7 and 8, and: the third lens element 3 has negative refracting power. The optical axis region 462 of the image-side surface 46 of the fourth lens element 4 is concave. The seventh lens element 7 has negative refracting power. It should be noted that, in order to show the view clearly, some numerals which are the same as those used for the optical axis region and the periphery region in the first embodiment are omitted in FIG. 22.

Detailed optical data pertaining to the optical imaging lens 10 of the fifth embodiment is as shown in FIG. 24. In the optical imaging lens 10 of the fifth embodiment, the total effective focal length is 4.364 mm, the half field of view (HFOV) is 36.998°, the f-number (Fno) is 1.600, the system length is 5.727 mm, and the image height is 3.238.

FIG. 25 shows each aspheric coefficient pertaining to the object-side surface 15 of the first lens element 1 through the image-side surface 86 of the eighth lens element 8 in the equation (1) in the fifth embodiment.

Additionally, the relationship among the important parameters pertaining to the optical imaging lens 10 of the fifth embodiment is indicated in FIG. 46.

In FIG. 23A which illustrates longitudinal spherical aberration of the fifth embodiment in the condition that the pupil radius is 1.3539 mm, the imaging point deviation of the off-axis ray at different heights is controlled within a range of ±0.02 mm. In FIGS. 23B and 23C which illustrate two diagrams of field curvature aberration, the focal length variation of the three representative wavelengths in the entire field of view falls within a range of ±0.035 mm. In FIG. 23D, the diagram of distortion aberration shows that the distortion aberration in the fifth embodiment can be maintained within a range of ±1.8%. In view of the above, the fifth embodiment can provide a good imaging quality as compared to the first embodiment in the condition that the system length is reduced to about 5.727 mm.

Based on the above, it can be derived that the half field of view of the fifth embodiment is larger than the half field of view of the first embodiment, and the field curvature of the fifth embodiment is smaller than the field curvature of the first embodiment.

FIG. 26 is a schematic view illustrating an optical imaging lens according to a sixth embodiment of the invention, FIGS. 27A to 27D are diagrams illustrating longitudinal spherical aberration and other aberrations of the optical imaging lens according to the sixth embodiment of the invention. Referring to FIG. 26, the sixth embodiment of the optical imaging lens 10 of the invention is similar to the first embodiment, and the difference lies in optical data, aspheric coefficients and the parameters of the lens elements 1, 2, 3, 4, 5, 6, 7 and 8, and: the third lens element 3 has negative refracting power. The optical axis region 551 of the object-side surface 55 of the fifth lens element 5 is convex. It should be noted that, in order to show the view clearly, some numerals which are the same as those used for the optical axis region and the periphery region in the first embodiment are omitted in FIG. 26.

Detailed optical data pertaining to the optical imaging lens 10 of the sixth embodiment is as shown in FIG. 28. In the optical imaging lens 10 of the sixth embodiment, the total effective focal length is 4.355 mm, the half field of view (HFOV) is 37.004°, the f-number (Fno) is 1.600, the system length is 6.002 mm and the image height is 3.238 mm.

FIG. 29 shows each aspheric coefficient pertaining to the object-side surface 15 of the first lens element 1 through the image-side surface 86 of the eighth lens element 8 in the equation (1) in the sixth embodiment.

Additionally, the relationship among the important parameters pertaining to the optical imaging lens 10 of the sixth embodiment is indicated in FIG. 47.

In FIG. 27A which illustrates longitudinal spherical aberration of the sixth embodiment in the condition that the pupil radius is 1.3610 mm, the imaging point deviation of the off-axis ray at different heights is controlled within a range of ±0.0075 mm. In FIGS. 27B and 27C which illustrate two diagrams of field curvature aberration, the focal length variation of the three representative wavelengths in the entire field of view falls within a range of ±0.035 mm. In FIG. 27D, the diagram of distortion aberration shows that the distortion aberration in the sixth embodiment can be maintained within a range of ±1.6%. In view of the above, the sixth embodiment can provide a good imaging quality as compared to the first embodiment in the condition that the system length is reduced to about 6.002 mm.

Based on the above, it can be derived that the half field of view of the sixth embodiment is larger than the half field of view of the first embodiment, and the longitudinal spherical aberration of the sixth embodiment is smaller than the longitudinal spherical aberration of the first embodiment. Meanwhile, the field curvature of the sixth embodiment is smaller than the field curvature of the first embodiment.

Figure 30:
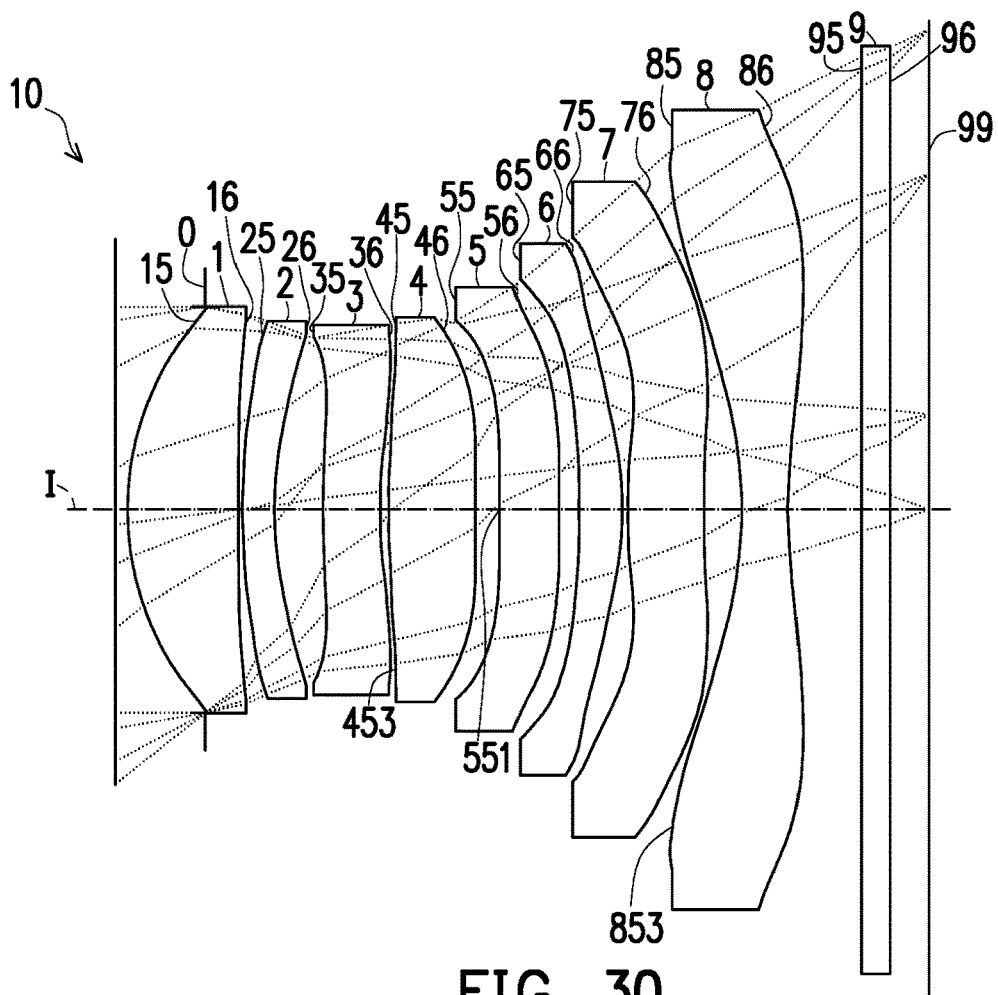
FIG. 30 is a schematic view illustrating an optical imaging lens according to a seventh embodiment of the invention.

FIG. 30 is a schematic view illustrating an optical imaging lens according to a seventh embodiment of the invention, FIGS. 31A to 31D are diagrams illustrating longitudinal spherical aberration and other aberrations of the optical imaging lens according to the seventh embodiment of the invention. Referring to FIG. 30, the seventh embodiment of the optical imaging lens 10 of the invention is similar to the first embodiment, and the difference lies in optical data, aspheric coefficients and the parameters of the lens elements 1, 2, 3, 4, 5, 6, 7 and 8, and: the third lens element 3 has negative refracting power. The periphery region 453 of the object-side surface 45 of the fourth lens element 4 is convex. The optical axis region 551 of the object-side surface 55 of the fifth lens element 5 is convex. The periphery region 853 of the object-side surface 85 of the eighth lens element 8 is convex. It should be noted that, in order to show the view clearly, some numerals which are the same as those used for the optical axis region and the periphery region in the first embodiment are omitted in FIG. 30.

Detailed optical data pertaining to the optical imaging lens 10 of the seventh embodiment is as shown in FIG. 32. In the optical imaging lens 10 of the seventh embodiment, the total effective focal length is 4.364 mm, the half field of view (HFOV) is 37.011°, the f-number (Fno) is 1.600, the system length is 5.479 mm, and the image height is 3.238 mm.

FIG. 33 shows each aspheric coefficient pertaining to the object-side surface 15 of the first lens element 1 through the image-side surface 86 of the eighth lens element 8 in the equation (1) in the seventh embodiment.

Additionally, the relationship among the important parameters pertaining to the optical imaging lens 10 of the seventh embodiment is indicated in FIG. 47.

Figures 31A, 31B, 31C, 31D:
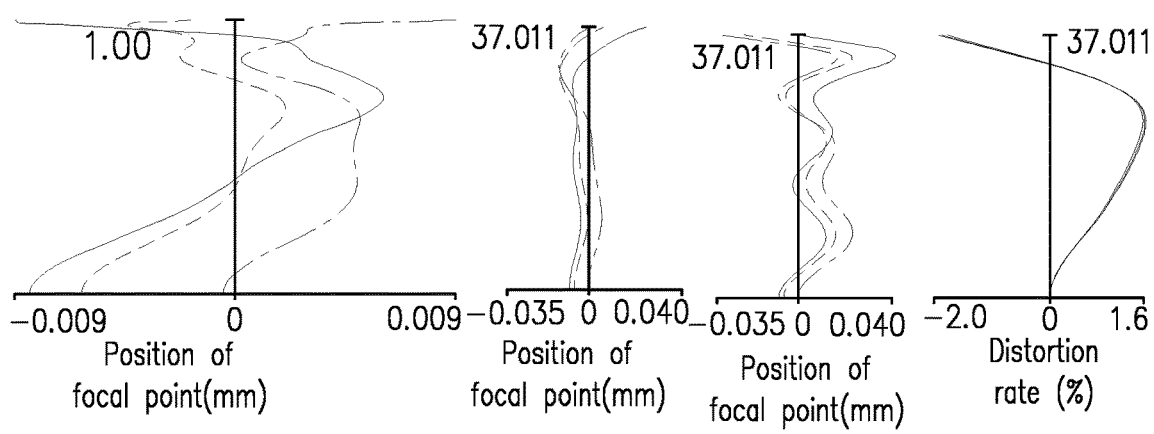
FIG. 31A to FIG. 31D are diagrams illustrating longitudinal spherical aberration and other aberrations of the optical imaging lens according to the seventh embodiment of the invention.

In FIG. 31A which illustrates longitudinal spherical aberration of the seventh embodiment in the condition that the pupil radius is 1.3638 mm, the imaging point deviation of the off-axis ray at different heights is controlled within a range of ±0.009 mm. In FIGS. 31B and 31C which illustrate two diagrams of field curvature aberration, the focal length variation of the three representative wavelengths in the entire field of view falls within a range of ±0.040 mm. In FIG. 31D, the diagram of distortion aberration shows that the distortion aberration in the seventh embodiment can be maintained within a range of ±2.0%. In view of the above, the seventh embodiment provides a good imaging quality as compared to the first embodiment in the condition that the system length is reduced to about 5.479 mm.

Based on the above, it can be derived that the half field of view of the seventh embodiment is larger than the half field of view of the first embodiment, and the longitudinal spherical aberration of the seventh embodiment is smaller than the longitudinal spherical aberration of the first embodiment.

Figure 34:
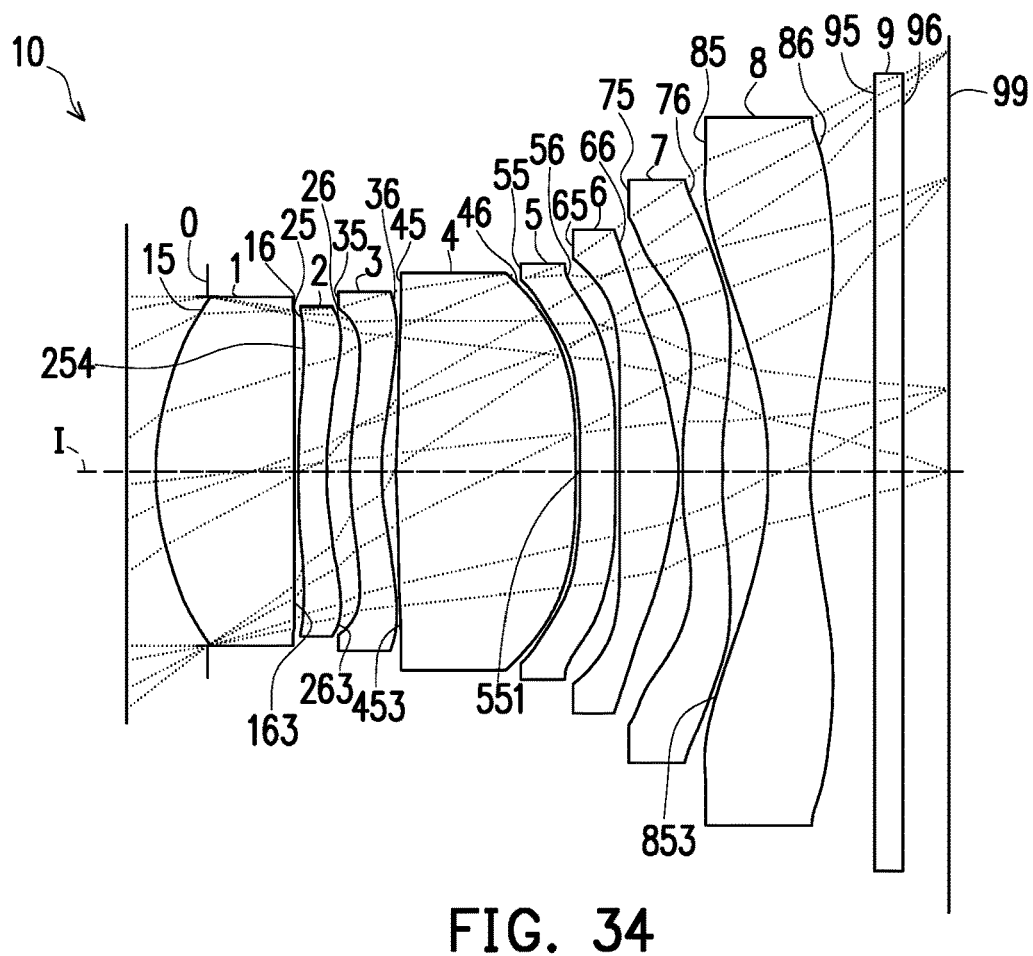
FIG. 34 is a schematic view illustrating an optical imaging lens according to an eighth embodiment of the invention.

FIG. 34 is a schematic view illustrating an optical imaging lens according to an eighth embodiment of the invention, FIGS. 35A to 35D are diagrams illustrating longitudinal spherical aberration and other aberrations of the optical imaging lens according to the eighth embodiment of the invention. Referring to FIG. 34, the eighth embodiment of the optical imaging lens 10 of the invention is similar to the first embodiment, and the difference lies in optical data, aspheric coefficients and the parameters of the lens elements 1, 2, 3, 4, 5, 6, 7 and 8, and: the periphery region 163 of the image-side surface 16 of the first lens element 1 is convex. The periphery region 254 of the object-side surface 25 of the second lens element 2 is concave. The periphery region 263 of the image-side surface 26 of the second lens element 2 is convex. The third lens element 3 has negative refracting power. The periphery region 453 of the object-side surface 45 of the fourth lens element 4 is convex. The periphery region 853 of the object-side surface 85 of the eighth lens element 8 is convex. It should be noted that, in order to show the view clearly, some numerals which are the same as those used for the optical axis region and the periphery region in the first embodiment are omitted in FIG. 34.

Detailed optical data pertaining to the optical imaging lens 10 of the eighth embodiment is as shown in FIG. 36. In the optical imaging lens 10 of the eighth embodiment, the total effective focal length is 4.273 mm, the half field of view (HFOV) is 36.998°, the f-number (Fno) is 1.600, the system length is 6.022 mm, and the image height is 3.238 mm.

FIG. 37 shows each aspheric coefficient pertaining to the object-side surface 15 of the first lens element 1 through the image-side surface 86 of the eighth lens element 8 in the equation (1) in the eighth embodiment.

Additionally, the relationship among the important parameters pertaining to the optical imaging lens 10 of the eighth embodiment is indicated in FIG. 47.

Figures 35A, 35B, 35C, 35D:
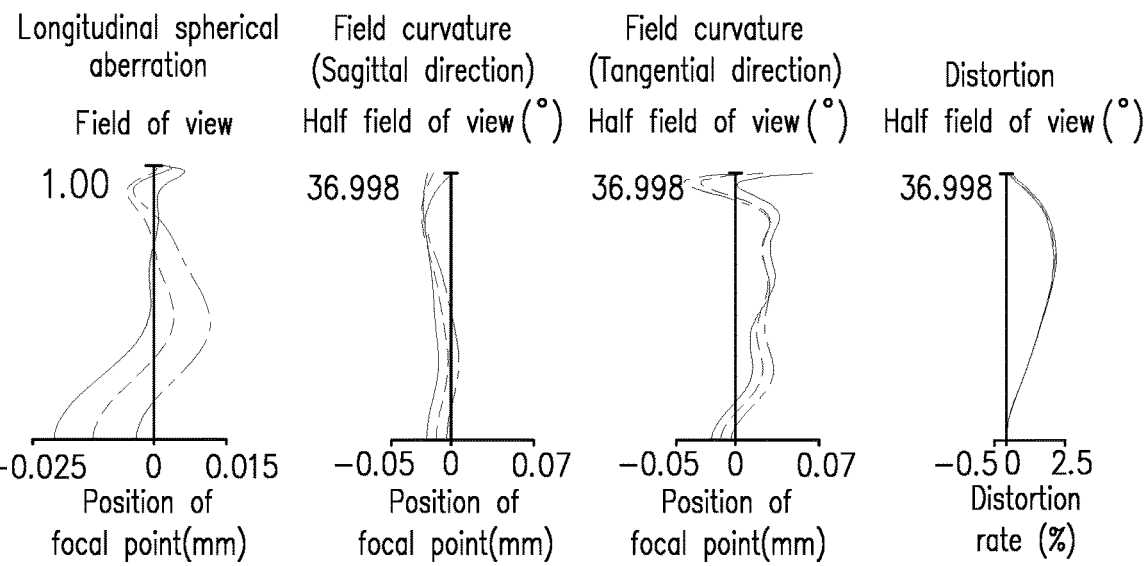
FIG. 35A to FIG. 35D are diagrams illustrating longitudinal spherical aberration and other aberrations of the optical imaging lens according to the eighth embodiment of the invention.

In FIG. 35A which illustrates longitudinal spherical aberration of the eighth embodiment in the condition that the pupil radius is 1.3354 mm, the imaging point deviation of the off-axis ray at different heights is controlled within a range of ±0.022 mm. In FIGS. 35B and 35C which illustrate two diagrams of field curvature aberration, the focal length variation of the three representative wavelengths in the entire field of view falls within a range of ±0.07 mm. In FIG. 35D, the diagram of distortion aberration shows that the distortion aberration in the eighth embodiment can be maintained within a range of ±2.0%. In view of the above, the eighth embodiment provides a good imaging quality as compared to the first embodiment in the condition that the system length is reduced to about 6.022 mm.

Based on the above, it can be derived that the half field of view of the eighth embodiment is larger than the half field of view of the first embodiment.

FIG. 38 is a schematic view illustrating an optical imaging lens according to a ninth embodiment of the invention, FIGS. 39A to 39D are diagrams illustrating longitudinal spherical aberration and other aberrations of the optical imaging lens according to the ninth embodiment of the invention. Referring to FIG. 38, the ninth embodiment of the optical imaging lens 10 of the invention is similar to the first embodiment, and the difference lies in optical data, aspheric coefficients and the parameters of the lens elements 1, 2, 3, 4, 5, 6, 7 and 8, and: the periphery region 263 of the image-side surface 26 of the second lens element 2 is convex. The third lens element 3 has negative refracting power. The periphery region 364 of the image-side surface 36 of the third lens element 3 is concave. The periphery region 453 of the object-side surface 45 of the fourth lens element 4 is convex. The optical axis region 561 of the image-side surface 56 of the fifth lens element 5 is convex. The optical axis region 652 of the object-side surface 65 of the sixth lens element 6 is concave. The periphery region 853 of the object-side surface 85 of the eighth lens element 8 is convex. It should be noted that, in order to show the view clearly, some numerals which are the same as those used for the optical axis region and the periphery region in the first embodiment are omitted in FIG. 38.

Detailed optical data pertaining to the optical imaging lens 10 in the ninth embodiment is as shown in FIG. 40. In the optical imaging lens 10 of the ninth embodiment, the total effective focal length is 4.359 mm, the half field of view (HFOV) is 36.990°, the f-number (Fno) is 1.600, the system length is 5.792 mm, and the image height is 3.238 mm.

FIG. 41 shows each aspheric coefficient pertaining to the object-side surface 15 of the first lens element 1 through the image-side surface 86 of the eighth lens element 8 in the equation (1) in the ninth embodiment.

Additionally, the relationship among the important parameters pertaining to the optical imaging lens 10 of the ninth embodiment is indicated in FIG. 47.

In FIG. 39A which illustrates longitudinal spherical aberration of the eighth embodiment in the condition that the pupil radius is 1.3623 mm, the imaging point deviation of the off-axis ray at different heights is controlled within a range of ±0.014 mm. In FIGS. 39B and 39C which illustrate two diagrams of field curvature aberration, the focal length variation of the three representative wavelengths in the entire field of view falls within a range of ±0.045 mm. In FIG. 39D, the diagram of distortion aberration shows that the distortion aberration in the eighth embodiment can be maintained within a range of ±2.2%. In view of the above, the ninth embodiment provides a good imaging quality as compared to the first embodiment in the condition that the system length is reduced to about 5.792 mm.

Based on the above, it can be derived that the half field of view of the ninth embodiment is larger than the half field of view of the first embodiment.

FIG. 42 is a schematic view illustrating an optical imaging lens according to a tenth embodiment of the invention, FIGS. 43A to 43D are diagrams illustrating longitudinal spherical aberration and other aberrations of the optical imaging lens according to the tenth embodiment of the invention. Referring to FIG. 42, the tenth embodiment of the optical imaging lens 10 of the invention is similar to the first embodiment, and the difference lies in optical data, aspheric coefficients and the parameters of the lens elements 1, 2, 3, 4, 5, 6, 7 and 8, and: the fourth lens element 4 has negative refracting power. The optical axis region 462 of the image-side surface 46 of the fourth lens element 4 is concave. The fifth lens element 5 has positive refracting power. The optical axis region 551 of the object-side surface 55 of the fifth lens element 5 is convex. The seven lens element 7 has negative refracting power. It should be noted that, in order to show the view clearly, some numerals which are the same as those used for the optical axis region and the periphery region in the first embodiment are omitted in FIG. 42.

Detailed optical data pertaining to the optical imaging lens 10 in the tenth embodiment is as shown in FIG. 44. In the optical imaging lens 10 of the tenth embodiment, the total effective focal length is 4.225 mm, the half field of view (HFOV) is 37.456°, the f-number (Fno) is 1.600, the system length is 5.475 mm, and the image height is 3.238 mm.

FIG. 45 shows each aspheric coefficient pertaining to the object-side surface 15 of the first lens element 1 through the image-side surface 86 of the eighth lens element 8 in the equation (1) in the tenth embodiment.

Additionally, the relationship among the important parameters pertaining to the optical imaging lens 10 of the tenth embodiment is indicated in FIG. 47.

In FIG. 43A which illustrates longitudinal spherical aberration of the tenth embodiment in the condition that the pupil radius is 1.3023 mm, the imaging point deviation of the off-axis ray at different heights is controlled within a range of ±0.044 mm. In FIGS. 43B and 43C which illustrate two diagrams of field curvature aberration, the focal length variation of the three representative wavelengths in the entire field of view falls within a range of ±0.12 mm. In FIG. 43D, the diagram of distortion aberration shows that the distortion aberration in the eighth embodiment can be maintained within a range of ±2.5%. In view of the above, the tenth embodiment provides a good imaging quality as compared to the first embodiment in the condition that the system length is reduced to about 5.475 mm.

Based on the above, it can be derived that the system length of the tenth embodiment is shorter than the system length of the first embodiment. Meanwhile, the half field of view of the tenth embodiment is larger than the half field of view of the first embodiment.

Referring to FIG. 46 to FIG. 47, FIG. 46 and FIG. 47 are table diagrams showing the optical parameters provided in the foregoing ten embodiments.

Regarding the following condition expressions, at least one of the purposes is to allow the effective focal length and optical parameters to be maintain within an appropriate range to avoid that the parameter of the optical element is too large and consequently makes it difficult to correct the aberrations of the overall optical imaging system, or avoid that the parameter of the optical element is too small for the optical element to be assembled or produced.

The optical imaging lens 10 may satisfy the condition expression: $FL/(T1+T4+BFL) \leq 2.600$, and more preferably satisfy $1.000 \leq EFL/(T1+T4+BFL) \leq 2.600$.

Regarding the following condition expressions, at least one of the purposes is to allow the thickness and gap of each lens element to be maintain within an appropriate range to avoid that the parameter of the optical element is too large and consequently makes it difficult to achieve slimness of overall optical imaging lens, or avoid that the parameter of the optical element is too small for the optical element to be assembled or produced.

The optical imaging lens 10 may satisfy the condition expression: $TTL/(T1+T4+BFL) \leq 3.900$, and more preferably satisfy $1.300 \leq TTL/(T1+T4+BFL) \leq 3.900$;

The optical imaging lens 10 may satisfy the condition expression: $TL/(T1+T4+BFL) \leq 3.600$; and more preferably satisfy $1.000 \leq TL/(T1+T4+BFL) \leq 3.600$;

The optical imaging lens 10 may satisfy the condition expression: $ALT/(T2+T6+T8) \leq 4.700$; and more preferably satisfy $2.000 \leq ALT/(T2+T6+T8) \leq 4.700$;

The optical imaging lens 10 may satisfy the condition expression: $(AAG+BFL)/(T2+T6+T8) \leq 3.600$, and more preferably satisfy $1.390 \leq (AAG+BFL)/(T2+T6+T8) \leq 3.600$;

The optical imaging lens 10 may satisfy the condition expression: $AAG/(T2+T6+T8) \leq 2.200$, and more preferably satisfy $0.790 \leq AAG/(T2+T6+T8) \leq 2.200$;

The optical imaging lens 10 may satisfy the condition expression: $(T2+T8+G67)/G23 \leq 3.200$, and more preferably satisfy $0.300 \leq (T2+T8+G67)/G23 \leq 3.200$;

The optical imaging lens 10 may satisfy the condition expression: $(T2+T8+G67)/G78 \leq 2.500$, and more preferably satisfy $0.400 \leq (T2+T8+G67)/G78 \leq 2.500$;

The optical imaging lens 10 may satisfy the condition expression: $(T2+T8+G67)/T6 \leq 2.400$, and more preferably satisfy $0.550 \leq (T2+T8+G67)/T6 \leq 2.400$;

The optical imaging lens 10 may satisfy the condition expression: $(T3+T5+T7+G12)/T2 \leq 7.800$, and more preferably satisfy $2.150 \leq (T3+T5+T7+G12)/T2 \leq 7.800$;

The optical imaging lens 10 may satisfy the condition expression: $(T3+T5+T7+G34)/T4 \leq 2.700$, and more preferably satisfy $0.680 \leq (T3+T5+T7+G34)/T4 \leq 2.700$;

The optical imaging lens 10 may satisfy the condition expression: $(T3+T5+T7+G45)/T6 \leq 5.000$, and more preferably satisfy $1.100 \leq (T3+T5+T7+G45)/T6 \leq 5.000$;

The optical imaging lens 10 may satisfy the condition expression: $(T3+T5+T7+G56)/T8 \leq 5.900$, and more preferably satisfy $1.200 \leq (T3+T5+T7+G56)/T8 \leq 5.900$;

The optical imaging lens 10 may satisfy the condition expression: $(T3+T5+T7+G78)/T1 \leq 3.100$, and more preferably satisfy $1.100 \leq (T3+T5+T7+G78)/T1 \leq 3.100$.

In addition, it is optional to select a random combination relationship of the parameter in the embodiment to increase limitation of the optical imaging lens for the ease of designing the optical imaging lens having the same structure in the invention. Due to the unpredictability in the design of an optical system, with the framework of the embodiments of the invention, under the circumstances where the above-described conditions are satisfied, the optical imaging system according to the embodiments of the invention with shorter length, improved imaging quality, or better yield rate can be preferably achieved so as to improve the shortcoming of prior art.

The above-limited relation is provided in an exemplary sense and can be randomly and selectively combined and applied to the embodiments of the invention in different manners; the invention should not be limited to the above examples. In implementation of the invention, apart from the above-described relations, it is also possible to add additional detailed structure such as more concave and convex curvatures arrangement of a specific lens element or a plurality of lens elements so as to enhance control of system property and/or resolution. For example, the periphery region of the object-side surface 35 of the third lens element 3 is concave optionally. It should be noted that the above-described details can be optionally combined and applied to the other embodiments of the invention under the condition where they are not in conflict with one another.

Based on the above, the optical imaging lens 10 in the embodiment of the invention can achieve the following effects and advantages:

1. The longitudinal spherical aberrations, astigmatism aberrations and distortion aberrations of each of the embodiments of the invention are all complied with usage specifications. Moreover, the off-axis rays of different heights of the three representative wavelengths red, green and blue are all gathered around imaging points, and according to a deviation range of each curve, it can be seen that deviations of the imaging points of the off-axis rays of different heights are all controlled to achieve a good capability to suppress spherical aberration, astigmatism aberration and distortion aberration. Further referring to the imaging quality data, distances among the three representative wavelengths red, green and blue are fairly close, which represents that the optical imaging lens of the embodiments of the invention has a good concentration of rays with different wavelengths and under different states, and have an excellent capability to suppress dispersion, so it is learned that the optical imaging lens of the embodiments of the invention has excellent imaging quality with the design and coordination among the lens elements.

2. The first lens element 1 has positive refracting power, which can facilitate ray convergence.

3. In the embodiments of the invention, with the concave and convex design of the surface of the lens elements below: (1) the optical axis region 762 of the image-side surface 76 of the seventh lens element 7 is concave, or (2) the surface combination that the optical axis region 661 of the image-side surface 66 of the sixth lens element 6 is convex and the optical axis region 751 of the object-side surface 75 of the seventh lens element 7 is convex, or (3) the surface combination that the sixth lens element 6 has positive refracting power and the optical axis region 751 of the object-side surface 75 of the seventh lens element 7 is convex, and in coordination with that the optical axis region 852 of the object-side surface 85 of the eighth lens element 8 is concave, it is possible to facilitate to reduce length of optical imaging lens. At least one of the object-side surface 25 and the image-side surface 26 of the second lens element 2 is aspheric surface, at least one of the object-side surface 35 and the image-side surface 36 of the third lens element 3 is aspheric surface, at least one of the object-side surface 45 and the image-side surface 46 of the fourth lens element 4 is aspheric surface, both of the object-side surface 55 and the image-side surface 56 of the fifth lens element 5 are aspheric surfaces or both of the object-side surface 65 and the image-side surface 66 of the sixth lens element 6 are aspheric surfaces; with such design, it is possible to facilitate to correct aberrations.

4. When the condition expression $(G12+G34+G45)/G23 \leq 3.000$ is satisfied, it is possible for G23 to maintain an appropriate air gap with the limitation of aspheric lens element such that the length of the lens is reduced while a certain degree of optical imaging quality can be maintained, and it is more preferable that the condition expression $0.200 \leq (G12+G34+G45)/G23 \leq 3.000$ is satisfied.

5. When the determination expression $V1>V2+V3$, $V4>V2+V3$ or $V6>V2+V3$ is satisfied in coordination with any one of the condition expressions along with surface features, it is possible to facilitate to correct chromatic aberration of the optical imaging lens.

The numeral range containing the maximum and minimum values obtained through the combination of proportional relationship of the optical parameter disclosed in each embodiment of the invention may be used for implementation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical imaging lens, comprising a first lens element, a second lens element, a third lens element, a fourth lens element, a fifth lens element, a sixth lens element, a seventh lens element and an eighth lens element arranged in sequence from an object side to an image side along an optical axis, each of the first lens element through the eighth lens element having an object-side surface facing the object side and allowing image rays to pass through as well as an image-side surface facing the image side and allowing the imaging rays to pass through, wherein:
a periphery region of the image-side surface of the first lens element is concave;
an optical axis region of the object-side surface of the fourth lens element is convex;
the sixth lens element has positive refracting power;
an optical axis region of the object-side surface of the seventh lens element is convex, and an optical axis region of the image-side surface of the seventh lens element is concave;
wherein lens elements of the optical imaging lens are only the eight lens elements described above, and the optical imaging lens satisfies the condition expressions: $(T3+T5+T7+G78)/T1 \leq 3.100$ and $AAG/(T2+T6+T8) \leq 2.200$,
wherein T3 is a thickness of the third lens element along the optical axis, T5 is a thickness of the fifth lens element along the optical axis, T7 is a thickness of the seventh lens element along the optical axis, G78 is an air gap between the seventh lens element and the eighth lens element along the optical axis, T1 is a thickness of the first lens element along the optical axis, AAG is a sum of seven air gaps among the first lens element through the eighth lens element along the optical axis, T2 is a thickness of the second lens element along the optical axis, T6 is a thickness of the sixth lens element along the optical axis, and T8 is a thickness of the eighth lens element along the optical axis.

2. The optical imaging lens according to claim 1, wherein the optical imaging lens further satisfies the following condition expression: $TTL/(T1+T4+BFL) \leq 3.900$, wherein TTL is a distance from the object-side surface of the first lens element to an image plane along the optical axis, T4 is a thickness of the fourth lens element along the optical axis, and BFL is a distance from the image-side surface of the eighth lens element to the image plane along the optical axis.

3. The optical imaging lens according to claim 1, wherein the optical imaging lens further satisfies the following condition expression: ALT/(T2+T6+T8)≤4.700, wherein ALT is a sum of thicknesses of the first lens element through the eighth lens element along the optical axis.

4. The optical imaging lens according to claim 1, wherein the optical imaging lens further satisfies the following condition expression: (T3+T5+T7+G12)/T2≤7.800, wherein G12 is an air gap between the first lens element and the second lens element along the optical axis.

5. The optical imaging lens according to claim 1, wherein the optical imaging lens further satisfies the following condition expression: (T3+T5+T7+G56)/T8≤5.900, wherein G56 is an air gap between the fifth lens element and the sixth lens element along the optical axis.

6. The optical imaging lens according to claim 1, wherein the optical imaging lens further satisfies the following condition expression: TL/(T1+T4+BFL)≤3.600, wherein TL is a distance from of the object-side surface of the first lens element to the image-side surface of the eighth lens element along the optical axis, T4 is a thickness of the fourth lens element along the optical axis, and BFL is a distance from the image-side surface of the eighth lens element to an image plane along the optical axis.

7. The optical imaging lens according to claim 1, wherein the optical imaging lens further satisfies the following condition expression: (AAG+BFL)/(T2+T6+T8)≤3.600, wherein BFL is a distance from the image-side surface of the eighth lens element to an image plane along the optical axis.

8. An optical imaging lens, comprising a first lens element, a second lens element, a third lens element, a fourth lens element, a fifth lens element, a sixth lens element, a seventh lens element and an eighth lens element arranged in sequence from an object side to an image side along an optical axis, each of the first lens element through the eighth lens element having an object-side surface facing the object side and allowing image rays to pass through as well as an image-side surface facing the image side and allowing the imaging rays to pass through,
wherein:
a periphery region of the image-side surface of the first lens element is concave;
a periphery region of the image-side surface of the third lens element is concave;
an optical axis region of the object-side surface of the fourth lens element is convex;
an optical axis region of the object-side surface of the sixth lens element is convex;
an optical axis region of the object-side surface of the seventh lens element is convex, and an optical axis region of the image-side surface of the seventh lens element is concave;
wherein lens elements of the optical imaging lens are only the eight lens elements described above, and the optical imaging lens satisfies the condition expressions: (T3+T5+T7+G78)/T1≤3.100 and AAG/(T2+T6+T8)≤2.200,
wherein T3 is a thickness of the third lens element along the optical axis, T5 is a thickness of the fifth lens element along the optical axis, T7 is a thickness of the seventh lens element along the optical axis, G78 is an air gap between the seventh lens element and the eighth lens element along the optical axis, T1 is a thickness of the first lens element along the optical axis, AAG is a sum of seven air gaps among the first lens element through the eighth lens element along the optical axis, T2 is a thickness of the second lens element along the optical axis, T6 is a thickness of the sixth lens element along the optical axis, and T8 is a thickness of the eighth lens element along the optical axis.

9. The optical imaging lens according to claim 8, wherein the optical imaging lens further satisfies the following condition expression: (T3+T5+T7+G12)/T2≤7.800, wherein G12 is an air gap between the first lens element and the second lens element along the optical axis.

10. The optical imaging lens according to claim 8, wherein the optical imaging lens further satisfies the following condition expression: (T3+T5+T7+G56)/T8≤5.900, wherein G56 is an air gap between the fifth lens element and the sixth lens element along the optical axis.

11. The optical imaging lens according to claim 8, wherein the optical imaging lens further satisfies the following condition expression: TL/(T1+T4+BFL)≤3.600, wherein TL is a distance from of the object-side surface of the first lens element to the image-side surface of the eighth lens element along the optical axis, T4 is a thickness of the fourth lens element along the optical axis, and BFL is a distance from the image-side surface of the eighth lens element to an image plane along the optical axis.

12. The optical imaging lens according to claim 8, wherein the optical imaging lens further satisfies the following condition expression: (AAG+BFL)/(T2+T6+T8)≤3.600, wherein BFL is a distance from the image-side surface of the eighth lens element to an image plane along the optical axis.

13. The optical imaging lens according to claim 8, wherein an optical axis region of the object-side surface of the third lens element is convex.

14. The optical imaging lens according to claim 8, wherein an optical axis region of the image-side surface of the third lens element is concave.

15. An optical imaging lens, comprising a first lens element, a second lens element, a third lens element, a fourth lens element, a fifth lens element, a sixth lens element, a seventh lens element and an eighth lens element arranged in sequence from an object side to an image side along an optical axis, each of the first lens element through the eighth lens element having an object-side surface facing the object side and allowing image rays to pass through as well as an image-side surface facing the image side and allowing the imaging rays to pass through,
wherein:
a periphery region of the image-side surface of the first lens element is concave;
a periphery region of the image-side surface of the third lens element is concave;
a periphery region of the object-side surface of the fifth lens element is concave;
the sixth lens element has positive refracting power;
an optical axis region of the object-side surface of the seventh lens element is convex, and an optical axis region of the image-side surface of the seventh lens element is concave;
wherein lens elements of the optical imaging lens are only the eight lens elements described above, and the optical imaging lens satisfies the condition expressions: (T3+T5+T7+G78)/T1≤3.100,
wherein T3 is a thickness of the third lens element along the optical axis, T5 is a thickness of the fifth lens element along the optical axis, T7 is a thickness of the seventh lens element along the optical axis, G78 is an air gap between the seventh lens element and the eighth lens element along the optical axis, and T1 is a thickness of the first lens element along the optical axis.

16. The optical imaging lens according to claim 15, wherein the optical imaging lens further satisfies the following condition expression: ALT/(T2+T6+T8)≤4.700, wherein ALT is a sum of thicknesses of the first lens element through the eighth lens element along the optical axis, T2 is a thickness of the second lens element along the optical axis, T6 is a thickness of the sixth lens element along the optical axis, and T8 is a thickness of the eighth lens element along the optical axis.

17. The optical imaging lens according to claim 15, wherein the optical imaging lens further satisfies the following condition expression: (T3+T5+T7+G12)/T2≤7.800, wherein G12 is an air gap between the first lens element and the second lens element along the optical axis, and T2 is a thickness of the second lens element along the optical axis.

18. The optical imaging lens according to claim 15, wherein the optical imaging lens further satisfies the following condition expression: TL/(T1+T4+BFL)≤3.600, wherein TL is a distance from of the object-side surface of the first lens element to the image-side surface of the eighth lens element along the optical axis, T4 is a thickness of the fourth lens element along the optical axis, and BFL is a distance from the image-side surface of the eighth lens element to an image plane along the optical axis.

19. The optical imaging lens according to claim 15, wherein a periphery region of the image-side surface of the fourth lens element is convex.

20. The optical imaging lens according to claim 15, wherein the optical imaging lens further satisfies the following condition expression: (T3+T5+T7+G45)/T6≤5.000, wherein G45 is an air gap between the fourth lens element and the fifth lens element along the optical axis, and T6 is a thickness of the sixth lens element along the optical axis.

* * * * *